(12) United States Patent
Lee et al.

(10) Patent No.: US 8,935,071 B2
(45) Date of Patent: Jan. 13, 2015

(54) OPTIMAL FUSION OF ELECTRIC PARK BRAKE AND HYDRAULIC BRAKE SUB-SYSTEM FUNCTIONS TO CONTROL VEHICLE DIRECTION

(71) Applicant: GM Global Technology Operations LLC, Detroit, MI (US)

(72) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 13/894,674

(22) Filed: May 15, 2013

(65) Prior Publication Data

US 2013/0253793 A1 Sep. 26, 2013

Related U.S. Application Data

(63) Continuation-in-part of application No. 13/101,397, filed on May 5, 2011, now Pat. No. 8,670,903.

(51) Int. Cl.
*G06F 19/00* (2011.01)
*B60T 7/12* (2006.01)

(52) U.S. Cl.
USPC ............. 701/70; 303/193; 303/191; 303/123; 180/170

(58) Field of Classification Search
USPC ...................... 701/70, 96; 303/193, 191, 123; 180/170, 204
See application file for complete search history.

(56) References Cited

U.S. PATENT DOCUMENTS

| | | | | |
|---|---|---|---|---|
| 5,469,356 A | * | 11/1995 | Hawkins et al. ................. | 701/48 |
| 7,673,950 B2 | * | 3/2010 | Fulks et al. ..................... | 303/193 |
| 2005/0029864 A1 | * | 2/2005 | Bauer et al. ..................... | 303/191 |
| 2006/0091728 A1 | * | 5/2006 | Fulks et al. ..................... | 303/193 |
| 2013/0184954 A1 | * | 7/2013 | Treppenhauer et al. ........ | 701/70 |

\* cited by examiner

*Primary Examiner* — Ronnie Mancho
(74) *Attorney, Agent, or Firm* — Mickki D. Murray; Parks Wood LLC

(57) ABSTRACT

A method, for controlling direction of a vehicle as desired in connection with operation of an autonomous driving maneuver using selectively, independently and/or in combination, multiple electrical park brakes (EPBs) and multiple hydraulic brakes (HBs). The method includes determining a total brake force needed for redirecting the vehicle in a pre-determined manner, and determining whether an applicable EPB can provide the total brake force needed. The method further includes providing, if it is determined that the applicable EPB can provide the total brake force needed, a brake command instructing the applicable EPB to apply the total brake force. The method also includes determining, if it is determined that the EPB is alone insufficient, an optimal fusion of the EPBs and the HBs, including two front and two rear HBs, two rear EPBs, and in some embodiments, also two front EPBs.

20 Claims, 9 Drawing Sheets

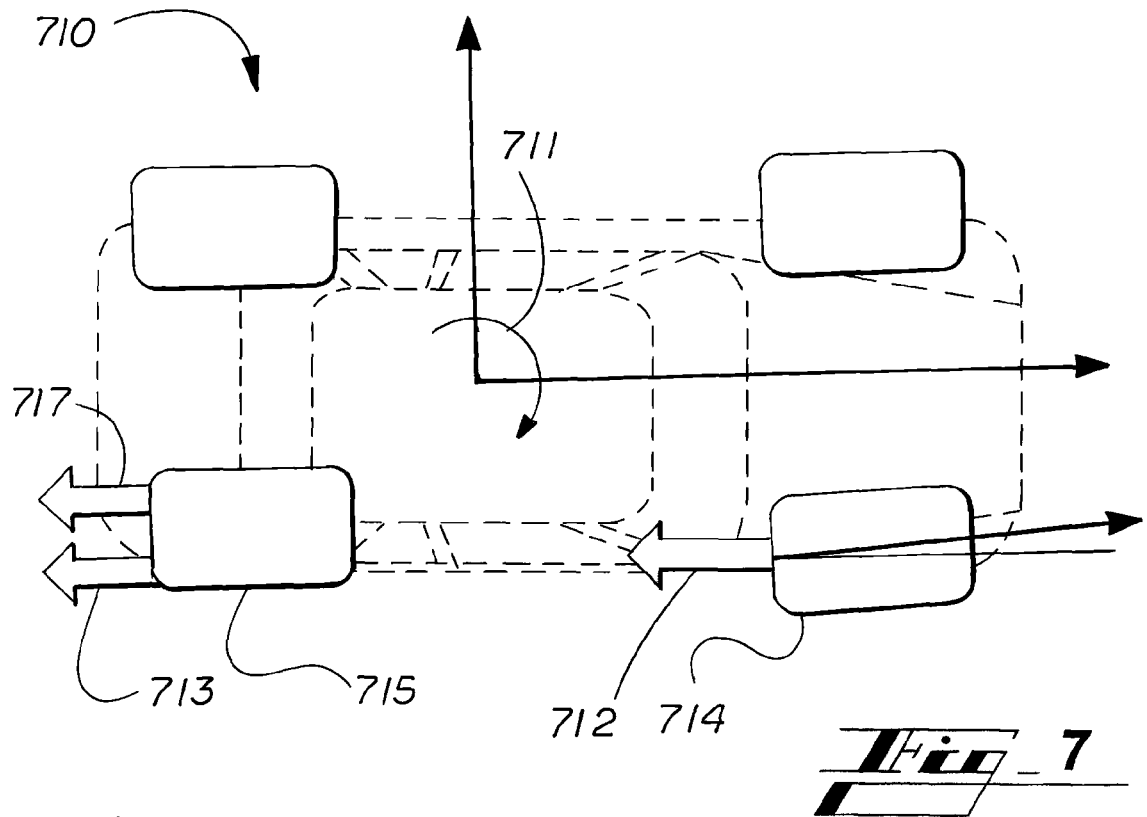
Fig_7
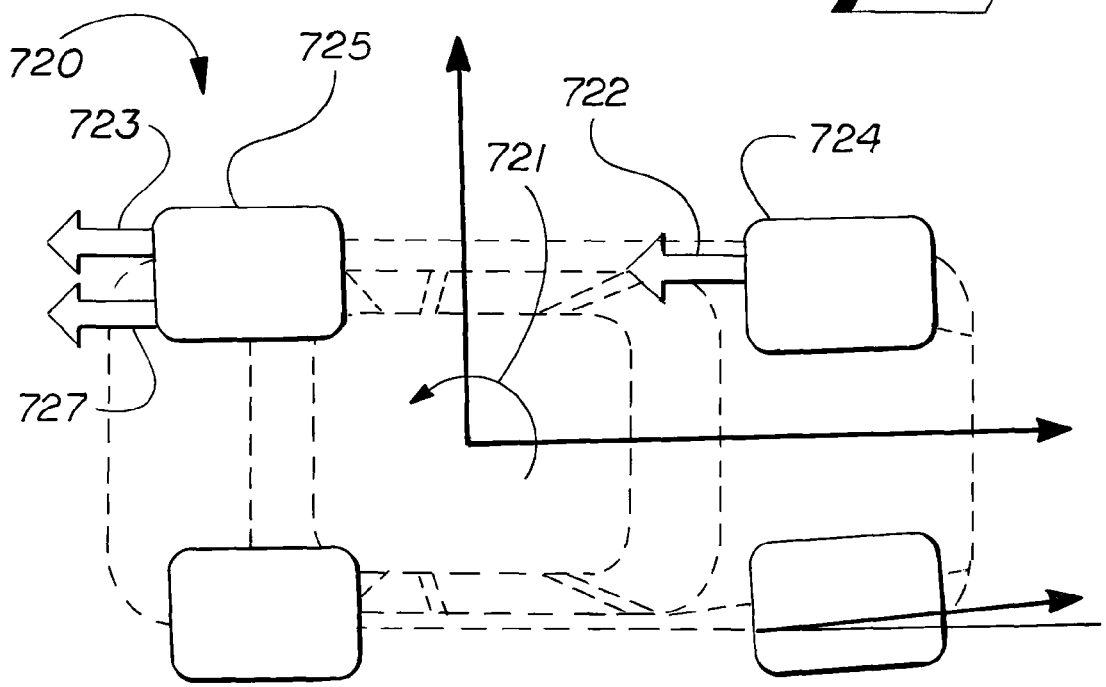
Fig_8

OPTIMAL FUSION OF ELECTRIC PARK BRAKE AND HYDRAULIC BRAKE SUB-SYSTEM FUNCTIONS TO CONTROL VEHICLE DIRECTION

TECHNICAL FIELD

The present disclosure relates generally to systems and methods for using functions of a vehicle electrical park brake (EPB) system and hydraulic brake system selectively to control vehicle direction and, more particularly, to systems and methods for using functions of a vehicle emergency brake system and hydraulic brake system selectively to control vehicle direction automatically in the event of a failure of automatic power steering.

BACKGROUND

Increasingly, vehicles are being equipped with autonomous and/or semi-autonomous driving mechanisms providing automated diving controls where less driver intervention is required. Though only a few vehicles today may have been created to be fully autonomous (i.e., capable of driving from point A to point B without any driver intervention), many commercially-available vehicles today may employ semi-autonomous features such as full speed range adaptive cruise control and lane keeping assist.

Cruise control systems, for example, have long been available where a driver sets the speed of the vehicle and the vehicle automatically controls the throttle. Adaptive cruise control systems have been developed too, where the system maintains a set speed and also automatically slows the vehicle if the system senses the vehicle is approaching a slower-moving vehicle.

Commercially available autonomous parking systems may automatically provide steering controls to park a vehicle. Further, semiautonomous, or "driver-assist" features, such as steering-torque assist or steering angle assist, automatically intervene if the driver makes a harsh steering maneuver that could affect vehicle stability.

In autonomous and semi-autonomous control systems, an automated lane centering (LC) system may provide automatic steering control for a vehicle, for example to center a vehicle in a lane as the vehicle moves on a curving road. An LC control system may allow a driver to be distracted, or even to not hold the steering wheel, while an LC system is engaged. An LC system may be incorporated into or used in connection with an electrical power steering (EPS) system in a vehicle. In such a configuration, the LC system may use electronic steering controls to turn the vehicle wheels (e.g., using a motor to move the steering column of the vehicle and thereby turning the vehicle wheels). By its use of the EPS system, an LC system may maintain the position of vehicle, for example, in the center of the lane in question. A LC system may also be used in applications such as lane changing.

As mentioned more below, the present technology can also be extended to related automatic driving functions, such as Lane Keeping Assist (LKA) and automated Lane Change Control (LXC). While lane centering (LC) is at time mentioned along, herein, the references should be read to incorporate also related automatic driving functions, such as these, Lane Keeping Assist (LKA) and automated Lane Change Control (LXC).

U.S. patent application Ser. No. 12/143,439 entitled "PATH GENERATION ALGORITHM FOR AUTOMATED LANE CENTERING AND LANE CHANGING CONTROL SYSTEM," and U.S. patent application Ser. No. 12/399,317 entitled "MODEL BASED PREDICTIVE CONTROL FOR AUTOMATED LANE CENTERING/CHANGING CONTROL SYSTEMS," both assigned to the assignee of this application and both herein incorporated by reference, disclose systems and methods for providing path generation for lane centering and lane changing in an autonomous or semi-autonomous vehicle.

Where the LC system uses an electrical power steering (EPS) system for its automatic steering control, it is possible that the EPS system could fail (for example, by communication system failure, control processor crash, mechanical problem in the steering system, etc.). In such a situation, an LC system could not, upon the failure, provide automatic steering control, because the system's ability to control the vehicle's steering would be cut-off. In some circumstances, a failure of an EPS system may cause the front wheels of the system to lock in their current steering angle position, causing further risk of vehicle accident.

SUMMARY

The present disclosure relates to a method, for controlling direction of a vehicle as needed in operation of an autonomous driving maneuver using selectively, independently and/or in combination, multiple electrical park brakes (EPBs) associated with at least two rear wheels of the vehicle and multiple hydraulic brakes associated with the at least two rear wheels of the vehicle and two front wheels of the vehicle. The method includes determining, by an in-vehicle processor, a total brake force needed for redirecting the vehicle in a pre-determined manner. The method also includes determining, by the processor, whether an applicable electrical park brake (EPB), of the multiple electrical park brakes (EPBs), can provide the total brake force needed. The method further includes providing, by the processor, if it is determined that the applicable electrical park brake (EPB) can provide the total brake force needed, a brake command instructing the applicable electrical park brake (EPB) to apply the total brake force. The method still further includes determining, by the processor, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

In a related embodiment of the method, the vehicle further includes front electrical park brakes (EPBs), associated with each of the front wheels of the vehicle, and determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

In another related embodiment of the method, the autonomous driving maneuver includes at least one maneuver selected from a group consisting of Lane Centering (LC), Lane Keeping Assist (LKA), and Lane Change Control (LXC).

In another related embodiment of the method, determining the optimal fusion includes processing a ramp threshold associated with the rear hydraulic brake.

In another related embodiment of the method, processing the ramp threshold includes commanding the applicable electrical park brake (EPB) to apply additional force momentarily to compensate for ramping up of the rear hydraulic brake.

In another related embodiment of the method, the operations further include activating a lane centering sub-system of the vehicle; determining that a failure condition affecting an electric power steering sub-system of the vehicle exists; and switching, in response to determining that the failure condition exists, operation of the lane centering sub-system from steering control to differential-braking control.

In another related embodiment of the method, the operations include determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; and determining whether applications of the front hydraulic portion of the total force would place a front tire, corresponding to the front hydraulic brake, outside of a friction ellipse associated with the front tire.

In another related embodiment of the method, the operations include determining, if both of the rear tire and the front tire would be placed outside of its respective friction ellipse by application of the determined forces, a new front/rear-brake distribution for providing the total brake force determined.

In another related embodiment of the method, the operations include determining, if only one of the rear tire and the front tire would be placed outside of its respective friction ellipse by application of the determined forces, a new yaw moment value and determining, based on the new moment value, a new total force to be effected at the vehicle.

In another aspect, the present disclosure relates to a vehicle system, comprising a processor and a computer-readable medium having instructions that, when executed by the processor, cause the processor to perform operations, for controlling direction of a vehicle using selectively multiple electrical park brakes (EPBs) and multiple hydraulic brakes of the vehicle. The operations include determining a total brake force needed for redirecting the vehicle in a pre-determined manner. The operations also include determining whether an applicable electrical park brake (EPB), of the multiple electrical park brakes (EPBs), can provide the total brake force needed. The operations also include providing, if it is determined that the applicable electrical park brake (EPB) can provide the total brake force needed, a brake command instructing the applicable electrical park brake (EPB) to apply the total brake force. And the operations include determining, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

In another related embodiment of the vehicle system, the vehicle further includes front electrical park brakes (EPBs), associated with each of the front wheels of the vehicle, and the operation of determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

In another related embodiment of the computer-readable medium, the operation of determining the optimal fusion includes processing a ramp threshold associated with the rear hydraulic brake.

In another related embodiment of the computer-readable medium, processing the ramp threshold includes commanding the applicable electrical park brake (EPB) to apply additional force momentarily to compensate for ramping up of the rear hydraulic brake.

In another related embodiment of the vehicle system, the operations further comprise determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; determining whether applications of the front hydraulic portion of the total force would place a front tire, corresponding to the front hydraulic brake, outside of a friction ellipse associated with the front tire; and determining, if both of the rear tire and the front tire would be placed outside of its respective friction ellipse by application of the determined forces, a new front/rear-brake distribution for providing the total brake force determined.

In another related embodiment of the vehicle system, the operations further include determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; determining whether applications of the front hydraulic portion of the total force would place a front tire, corresponding to the front hydraulic brake, outside of a friction ellipse associated with the front tire; and the operations further comprise determining, if only one of the rear tire and the front tire would be placed outside of its respective friction ellipse by application of the determined forces, a new yaw moment value and determining, based on the new moment value, a new total force to be effected at the vehicle.

In still other aspects, the present disclosure relates to a computer-readable storage device comprising a computer-readable medium having instructions that, when executed by a processor, cause the processor to perform operations, for controlling direction of a vehicle using selectively multiple electrical park brakes (EPBs) and multiple hydraulic brakes of the vehicle. The operations include determining a total brake force needed for redirecting the vehicle in a pre-determined manner. The operations also include determining whether an applicable electrical park brake (EPB), of the multiple electrical park brakes (EPBs), can provide the total brake force needed. The operations further include providing, if it is determined that the applicable electrical park brake (EPB) can provide the total brake force needed, a brake command instructing the applicable electrical park brake (EPB) to apply the total brake force. And the operations include determining, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

In another related embodiment of the computer-readable storage device, the vehicle further includes front electrical park brakes (EPBs), associated with each of the front wheels of the vehicle, and the operation of determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

In another related embodiment of the computer-readable storage device, the operation of determining the optimal fusion includes processing a ramp threshold associated with the rear hydraulic brake; and processing the ramp threshold includes commanding the applicable electrical park brake (EPB) to apply additional force momentarily to compensate for ramping up of the rear hydraulic brake.

In another related embodiment of the computer-readable storage device, the operation of determining the optimal fusion includes processing a ramp threshold associated with the rear hydraulic brake; and the operations further comprise (i) activating a lane centering sub-system of the vehicle (ii) determining that a failure condition affecting an electronic power steering sub-system of the vehicle exists, and (iii) switching, in response to determining that the failure condition exists, operation of the lane centering sub-system from steering control to differential-braking control.

In another related embodiment of the computer-readable storage device, the operations further include determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; and determining whether applications of the front hydraulic portion of the total force would place a front tire, corresponding to the front hydraulic brake, outside of a friction ellipse associated with the front tire.

Another embodiment of the present technology provides a fail-safe system for lane centering (LC) control, which may be used, for example, in a vehicle such as an automobile. In such an exemplary embodiment, a differential braking system and method may be applied as the fail-safe for the (LC) control system.

In one embodiment of the present technology, a redundant mechanism applying differential braking may be triggered, when the electrical power steering (EPS) (or automatic power steering (APS)) system of a vehicle fails. In such an example, differential braking control for the LC system may be activated only when the EPS system has failed to operate.

A method for fail-safe lane centering, may include monitoring an EPS system of a vehicle for a failure, and, upon determining that a failure of the EPS system has occurred, switching control flow for the lane centering system from a steering controller of the lane centering system to a differential braking controller, where the differential braking controller may output differential braking commands to a differential braking system, e.g., to apply braking forces to the wheels of vehicle, so the vehicle follows a desired path determined for lane centering.

A system for fail-safe performance of a lane centering system may include a differential braking controller coupled to a differential braking system, and a supervisory element coupled to the differential braking controller, the supervisory element configured to monitor an EPS system of a vehicle for a failure and, upon determining that a failure has occurred, switch an output of the lane centering system to an output of the differential braking controller, wherein the output of the differential braking controller provides a braking command to the differential braking system for an application of a braking force to a wheel of the vehicle, and where by the application of the braking force the vehicle follows or at least approaches better a desired path determined for a lane centering operation.

A non-transitory computer-readable medium may have instructions stored on the medium, which when executed by a processor, may cause the processor to perform methods described herein.

A method, system, and non-transitory computer-readable medium according to an embodiment of the technology, may determine a yaw moment needed by the LC control system. Yaw moment ($\Delta\tau$) for a vehicle represents an amount of force against the vehicle's center of gravity which may be applied to a vehicle to turn or pivot the vehicle and change its heading orientation. Based on that determined yaw moment, the method may calculate a sequence of differential braking forces to be applied to the wheels of the vehicle. The system and method may maintain the vehicle motion according to the sequence of differential braking forces for a period, for example, the next ($\Delta$) t seconds (e.g., the next 3 seconds, tunable), allowing the driver to get back to the steering control within the period.

In a method, system, and non-transitory computer-readable medium according to an embodiment of the present technology, a lane centering system may generate and the fail-safe system may use elements that may determine a desired path and a predicted path for a moving vehicle. For example, a lane mark detection system of a lane centering system may recognize lane marks in a road, dividing the road into lanes. A desired path generation module of a lane centering system may generate a smooth desired path for a lane centering according to vehicle dynamics (such as vehicle mass, inertia, dimensions, etc.) and the lane marks detected (such as generating a smooth path from the current vehicle position to the center of the lane as an example). A predicted path prediction system of a lane centering system may further generate the vehicle's predicted future path based on current vehicle dynamics such as vehicle speed, yaw rate, and the steering angle (the amount the front wheels of the vehicle are turned from being parallel with the sides of the vehicle).

In a lane centering system, a lane centering steering controller may control the steering angle of the vehicle via commands to a electrical power steering (EPS) system to move a vehicle to a determined lane center (and, for example, center the vehicle in the lane as it moves). However, in the event that the EPS system fails, the LC system may suddenly have no ability to change the steering angle.

An embodiment of the technology may provide, however, that in the event that a steering system failure is detected, a supervisory function may switch to a fail-safe braking controller, which, for example, may use differential braking to control the vehicle and, for example, maintain the vehicle in the lane.

In applying a differential braking control to maintain desired in-lane vehicle positioning, the fail-safe system may use the desired path and predicted path information available (e.g., from elements of the lane controller system or generated from fail-safe system sources) to find a sequence of braking commands for the available wheels of the vehicle. For example, the fail-safe system may find a braking command sequence such as, $F_{left\,front\,wheel}(t)$, $F_{right\,front\,wheel}(t)$, $F_{left\,rear\,wheel}(t)$, $F_{right\,front\,wheel}(t)$, on a time interval (such as $[0, \Delta T]$) that minimizes the difference of the desired path and the predicted path of the vehicle.

A fail-safe differential braking controller according to an embodiment of the technology may, for example, generate braking commands for each wheel to minimize orientation and offset errors (e.g., differences in vehicle heading and lateral offset position) between the vehicle's desired path and the vehicle's predicted path.

To minimize such orientation and offset errors between the vehicle's desired path and predicted path, the fail-safe differential braking controller according to an embodiment of the technology may use a cost function, wherein the orientation and offset errors between the vehicle's desired path and predicted path are minimized according to a yaw moment value for the vehicle.

As stated, yaw moment ($\Delta\tau$) for a vehicle represents an amount of force against the center of gravity of the vehicle which may be applied to the vehicle to turn or pivot the vehicle and change its yaw, or heading. Where a yaw moment ($\Delta\tau$) may be determined according to a cost function that minimizes the difference between vehicle's desired path and predicted path, the yaw moment ($\Delta\tau$) force, when applied, may move or keep the vehicle on a path that minimizes the difference between the vehicle's desired and predicted path. Thus, by generating forces to create the determined yaw moment ($\Delta\tau$), the vehicle will move toward, to, or stay on the desired path.

An embodiment of the present technology may provide that differential braking forces that may be applied by the fail-safe differential braking mechanism to exert force indicated by the yaw moment ($\Delta\tau$).

Once the yaw moment ($\Delta\tau$) is determined, the fail-safe differential braking controller according to an embodiment of the present technology may calculate, using the yaw moment ($\Delta\tau$), a total of front and rear brake forces ($F_{Total}$) to be applied in differential braking. That total front and rear brake force may be calculated for the wheels of either the right-hand side of the vehicle ($F_{Total\ RHS}$) or the left-hand side of vehicle ($F_{Total\ LHS}$).

It is noted that the yaw moment ($\Delta\tau$) may direct the vehicle to be turned in either a clockwise (CW) or counterclockwise (CCW) direction or the yaw moment ($\Delta\tau$) may determine that the vehicle may not be turned at all.

For example, a yaw moment ($\Delta\tau$) that is negative may indicate that the vehicle should be turned in a clockwise direction to maintain or move toward desired lane centering. To turn the vehicle in a clockwise direction, the fail-safe system may only apply differential braking force to the wheels on the right-hand side of the vehicle, and in such an instance very little or no braking force may be applied to the wheels on the left-hand side of the vehicle.

Correspondingly, a yaw moment ($\Delta\tau$) that is positive may indicate that the vehicle should be turned in a counterclockwise direction to maintain or move toward desired lane centering. To turn the vehicle in a counterclockwise direction, the fail-safe system may only apply differential braking force to the wheels of the left-hand side of the vehicle, and in such an instance very little or no braking force may be applied to the wheels on the right-hand side of the vehicle.

Accordingly, using an example of a vehicle having four wheels, such as an automobile, the total force calculated from the yaw moment ($\Delta\tau$) may be determined for one front and one rear wheel of the four-wheeled vehicle (i.e., the front and rear wheels of either the right-hand vehicle side (e.g., for CW turning movement) or the left-hand vehicle side (for CCW for turning movement).

Using the final total force determined from the yaw moment ($\Delta\tau$), the fail-safe differential braking controller may then determine a distribution ratio value $\alpha$ to distribute the total braking force, for example between the front and rear wheels of the vehicle where the distribution ratio value may be determined based on considerations such as loading and lateral acceleration. One example ratio may be the production ratio setup for a vehicle's common-mode braking. Proportioning the total braking force using a distribution ratio may adjust the brake torque output at front and rear wheels in accordance with a peak traction force (e.g., to achieve a maximum longitudinal force that may be available from the traction-braking control systems). Correct proportioning may seek to bring both axles (front and rear wheels) up to a lock-up point (point where the axles and their wheels do not turn) simultaneously.

The fail-safe differential braking controller may then determine if the combined braking and steering forces are within a friction ellipses for the wheels of the vehicle (using friction coefficients for the tires, etc.). If necessary, the differential braking controller may modify the distribution ratio of the total force (or, if needed, re-calculate the yaw moment ($\Delta\tau$) and the total force value) to fit the forces applied within parameters for vehicle stability.

With the force distribution determined, the fail-safe differential braking controller may access a differential braking system to have the forces applied to the brakes. The fail-safe differential braking controller may, for example, generate a sequence of braking commands for the available wheels of the vehicle on a interval (for example $\Delta t$ seconds, e.g., 3 seconds, a value which may be tuned or changed) to provide time for the operator of the vehicle to get back steering control.

Other aspects of the present technology will be in part apparent and in part pointed out hereinafter.

BRIEF DESCRIPTION OF THE DRAWINGS

FIGS. 7 and 8 illustrate clockwise and counterclockwise differential braking based on a yaw moment value, according to an embodiment of the present technology.

Figure 1:
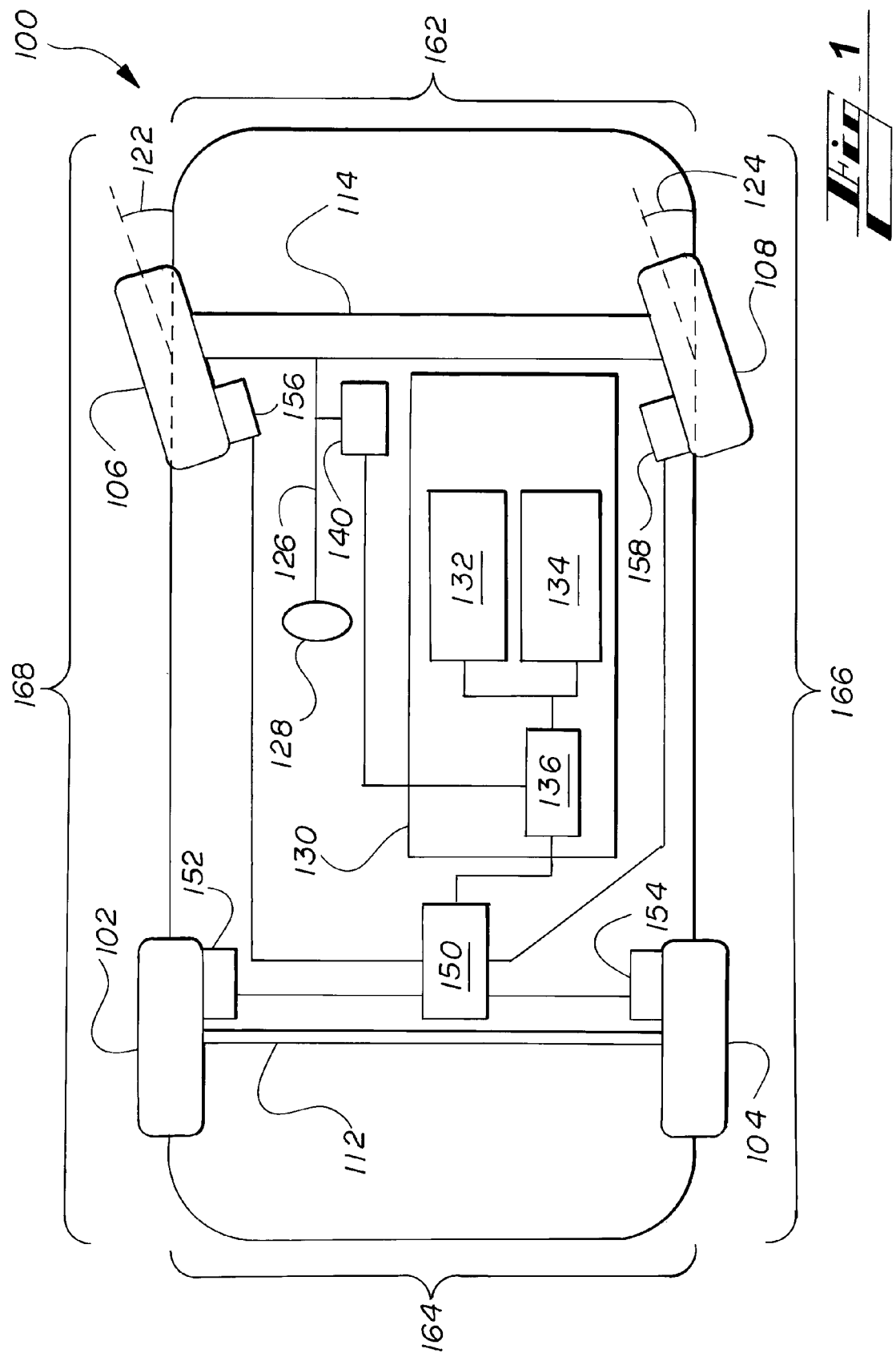
FIG. 1 illustrates in schematic form an exemplary vehicle with a differential braking fail-safe control for a lane centering system, according to an embodiment of the present technology.

It will be appreciated that for simplicity and clarity of illustration, elements shown in the figures have not necessarily been drawn to scale. Dimensions of some of the elements may, for example, be exaggerated relative to other elements for clarity. Further, where considered appropriate, reference numerals may be repeated among the figures to indicate corresponding or analogous elements.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., multiple components described herein in connection with one or more functions is to be interpreted to cover embodiments in which a single component performs the function(s).

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, the present disclosure relates generally to systems and methods for using functions of a vehicle emergency brake system and hydraulic brake system selectively to control vehicle direction and, more particularly, to systems and methods for using functions of a vehicle electrical park brake (EPB) system and hydraulic brake system selectively to control vehicle direction automatically in the event of a failure of automatic power steering.

The automatic power system and components fusing brake-systems functionality are part of or used in conjunction with autonomous or semi-autonomous driving control systems to control vehicle direction, such as in performing lane-centering maneuvers.

The present technology limits time delay between a determination that a needed vehicle path correction is to be performed using the braking systems and brake application causing the correction.

The technology also allows increased control over vehicle direction changes using the brakes—i.e., improved differential brake steering resolution.

In the following detailed description, numerous specific details are set forth in order to provide a thorough understanding of the technology. However, it will be understood by those skilled in the art that the present technology may be practiced without these specific details. In other instances, well-known methods, procedures, and components have not been described in detail so as not to obscure the present description of the technology.

II. Differential Braking Generally

FIGS. 1-8

Now turning to the figures, and more particularly the first figure, FIG. 1 illustrates elements of a lane centering (LC) system with fail-safe differential braking according to an embodiment of the present technology. FIG. 1 depicts vehicle 100, which may be an automobile or other vehicle, having front side 162, rear side 164, right side 166 and left side 168 (e.g., viewing the vehicle from above). Vehicle 100 is shown with wheels, e.g., left rear wheel 102, right rear wheel 104, left front wheel 106, right front wheel 108.

In other examples, vehicles having fewer wheels, e.g., 3, or more wheels, e.g., 6, 8, 16, may also be used according to the present technology).

In the example of FIG. 1, rear wheels 102, 104 may be coupled to and turn according to axle system 112. Front wheels 106, 108 may be connected to and turn according to axle system 114. Front wheels 106, 108 may also turn or be capable of being angled (as shown by steering angles 122, 124), for example, by turning of steering column 126 which is coupled to axle system 114. An operator may turn front wheels 106, 108 by moving steering wheel 128, coupled to steering column 126. Steering column 126 movements may be translated to angular movements (122, 124) of front wheels 106, 108. (The turning of the steering column may turn wheels 106, 108 to an equal angular degree, such that steering angles 122, 124 are equal).

Vehicle 100 may also include control systems for autonomous or semi-autonomous driving functions. The control system may include lane centering (LC) system 130. LC system 130 may include a steering controller for lane centering (LC steering controller) 132. As a fail-safe backup, an embodiment of the present technology may include a differential braking controller for lane centering (LC differential braking controller) 134.

LC steering controller 132 may operate in conjunction with an electronic power steering (EPS) system 140, to perform lane centering functions (maintaining a lane, changing lane, etc.). EPS system 140 may include, for example, an actuator motor that turns steering column 126 according to input commands. Steering controller system 132, for example, may output a stream of commands for setting the steering angle of wheels 106, 108. EPS system 140 may set the wheels to those angles in performing a lane centering function.

A supervisory module 136 may operate in conjunction with LC steering controller 132 to monitor the status of EPS system 140. Upon a failure of EPS system 140, such as a power failure, sensor failure, autonomous/semi-autonomous system failure or other failure (e.g., EPS system communication failure, EPS system power line failure, EPS system control processor failure, EPS system motor failure, mechanical problem in EPS system column or rack, flat tire, EPS steering torque imbalance, etc.), supervisory module 136 may pass control for lane centering system 130 to LC differential braking controller 134.

LC differential braking controller 134 may operate in conjunction with electronic differential braking system 150 (for embodiments, described in more detail below, in which electronic brakes are also controlled for vehicle steering, this system 150 can include EPB functions, and so include, or include functions of what can be referred to as an electronic brake control module (EBCM)) which may be configured to actuate the hydraulic brakes 152, 154, 156, 158 on wheels 102, 104, 106, 108 (and EPBs, as described further below regarding embodiments having EPBs). For example, electronic differential braking system 150 may apply different braking forces to the different wheels 102, 104, 106, 108, using the hydraulic brakes 152, 154, 156, 158 controlled by, for example, brake actuators.

LC differential braking controller 134 may provide a redundant mechanism for safety when EPS system 140 fails and the driver is not ready or is not able to take control of steering wheel 128. LC differential braking controller 134 may determine a yaw moment value, and then determine a braking force for wheels 102-108 to replicate the yaw moment.

LC differential braking controller 134 may then transmit commands to differential braking system 150 to control the braking force applied on brakes 152, 154, 156, 158 of wheels 102, 104, 106, 108, respectively to direct the vehicle's motion to follow a desired path determined by lane centering system 130. Motion may be maintained according to the desired path for a period, such as the next ($\Delta t$) seconds, to allow the operator to gain control of steering in vehicle 100.

Figure 2:
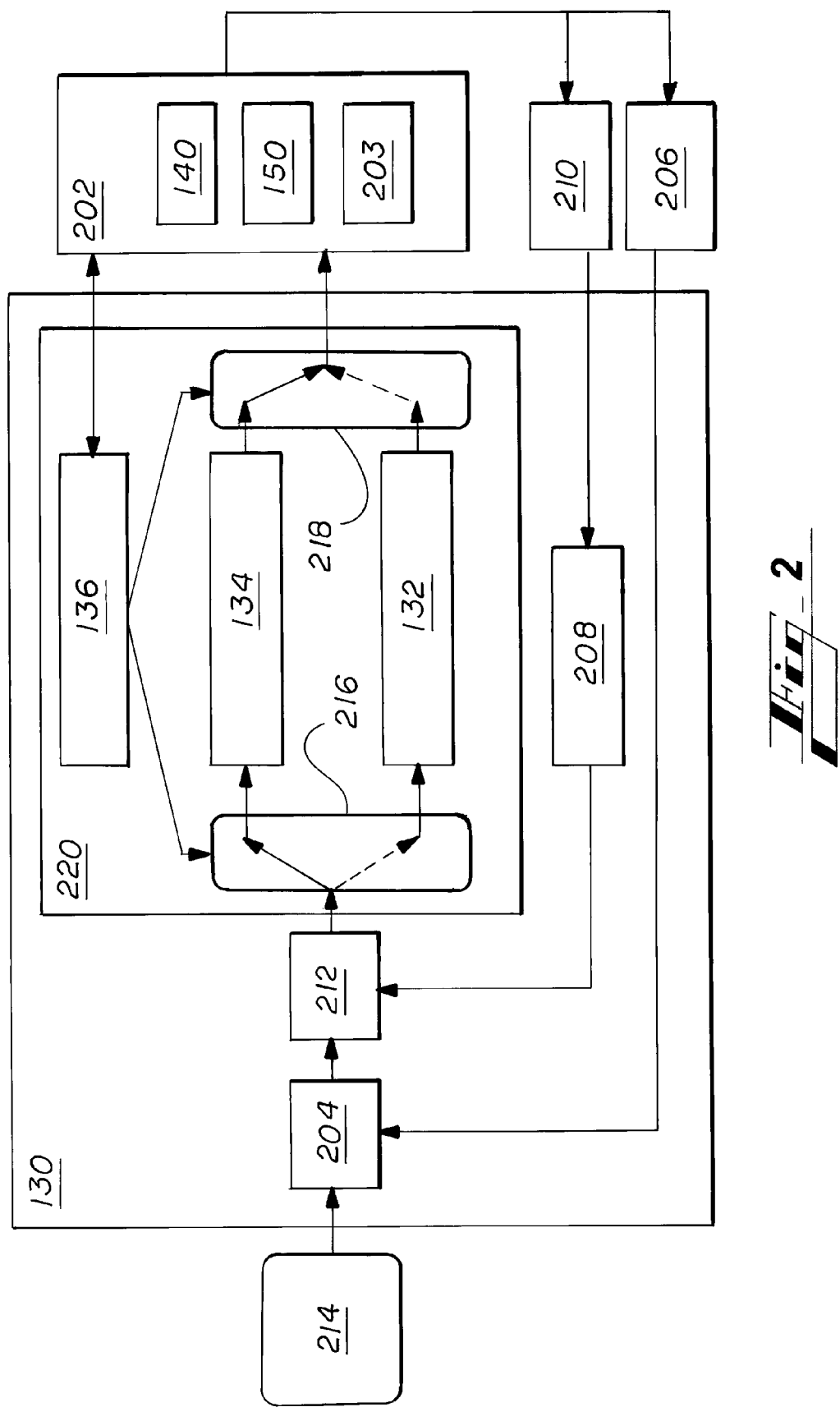
FIG. 2 illustrates in block diagram form elements of a differential braking fail-safe control for a lane centering system, according to an embodiment of the present technology.

Reference is now made to FIG. 2, which illustrates in block diagram form elements of a differential braking fail-safe control for a lane centering system, according to an embodiment of the present technology. FIG. 2 shows arbitration and supervisory control 220 within lane centering system 130 (with LC steering controller 132, LC differential braking controller 134 and supervisory function 136). EPS system 140 and differential braking system 150 from FIG. 1 are also shown along with additional elements. In FIG. 2, EPS system 140 and differential braking system 150 are included in vehicle dynamics systems 202 (e.g., as part of a more general autonomous or semi-autonomous vehicle control system).

In one example, lane centering system 130 may include elements that may determine a desired path and a predicted path for a moving vehicle. Desired path generation unit 204 may generate a smooth desired path for a lane centering function according to vehicle dynamics (e.g., vehicle mass, inertia, dimensions, etc.) and the lane marks detected (where lane mark information may be provided by lane mark detection unit 206). Predicted path generation unit 208 may further generate the vehicle's predicted future path based on current vehicle dynamics (e.g., provided by vehicle state estimation unit 210), such as vehicle speed, yaw rate, and the steering angle (the amount the front wheels of the vehicle are turned from being parallel with the sides of the vehicle).

In lane centering system 130, LC controller 212 may receive inputs of desired path and predicted path to generate (e.g., determine) yaw moments, which may be received by arbitration and supervisory control 220 and used by either LC steering controller 132 or LC differential braking controller 134, depending on whether or not supervisory function 136 has detected a failure of EPS system 140.

Systems and methods for determining and generating desired and predicted paths and desired and predicted path data may be found in U.S. patent application Ser. No. 12/143,439 entitled "PATH GENERATION ALGORITHM FOR AUTOMATED LANE CENTERING AND LANE CHANGING CONTROL SYSTEM," and in U.S. patent application Ser. No. 12/399,317 entitled "MODEL BASED PREDICTIVE CONTROL FOR AUTOMATED LANE CENTERING/CHANGING CONTROL SYSTEMS," which are each assigned to assignee of this application and which are each hereby incorporated by reference herein in their entirety.

In FIG. 2, arbitration and supervisory control 220 may receive yaw moments and supervisory function 136 may monitor the status of EPS system 140 (e.g., via vehicle dynamics 202). If EPS system 140 operation is normal, the received yaw moments may be passed to LC steering controller 132. LC steering controller 132 may convert the received yaw moments to steering torque and generate commands for a steering angle ($\delta$) that may be passed to EPS system 140. In the event of a failure of EPS system 140 is detected, supervisory function 136 may switch control to LC differential braking controller 134. In such circumstances LC differential braking controller 134, instead of LC steering controller 132 may then receive yaw moments. Using the received yaw moments, LC differential braking controller 134 may, for example, generate differential braking forces and send commands for the braking forces to differential braking system 150 to control the vehicle and, for example maintain the desired path of the lane centering system 130 (e.g., in performing a lane change or maintaining centering in a lane).

In applying differential braking control to maintain a lane centering function, LC differential braking controller 134 (the fail-safe system) may use the yaw moments (e.g., yaw moment values generated from the desired path and predicted path information) to find a sequence of braking commands for the available wheels of the vehicle on a time interval. LC controller 212 may generate the yaw moments for example, using a cost minimization function that minimizes the difference between the desired path and the predicted path of the vehicle.

As shown in FIG. 2, as supervisory function 136 switches control (upon a failure of EPS system 140) from LC steering controller 132 to LC differential braking controller 134, input switch function 216 (e.g., a representation of a logical function of supervisory function 136) may pass yaw moment data (e.g., generated by LC controller 212) to LC differential braking controller 134 (as represented by the solid arrow in FIG. 2).

Additionally, output switch function 218 (e.g., a representation of a logical function of supervisory function 136) may send the output of LC differential braking controller 134 to vehicle dynamics 202 for processing by differential braking system 150 and/or the electrical park brakes (EPB) system 203, as described further below regarding the EPB system. When there is no failure of EPS system 140, functioning of arbitration and supervisory control 220 may be seen by the dashed arrows at switch functions 216 and 218, where yaw moment data is passed to LC steering controller 132, which determines steering torque (e.g., commands for steering torque), which may be passed to EPS system 140 LC differential braking controller 134 to generate braking commands for each wheel to minimize orientation and offset errors (e.g., differences in vehicle heading and lateral offset position) between the vehicle's desired path and the vehicle's predicted path based on received yaw moment values. Supervisory function 136, using the logical function of output switch 218 may transfer the commands for execution by differential braking system 150 and/or the electrical park brakes (EPB) system 203, as described further below regarding the EPB system.

Figure 3:
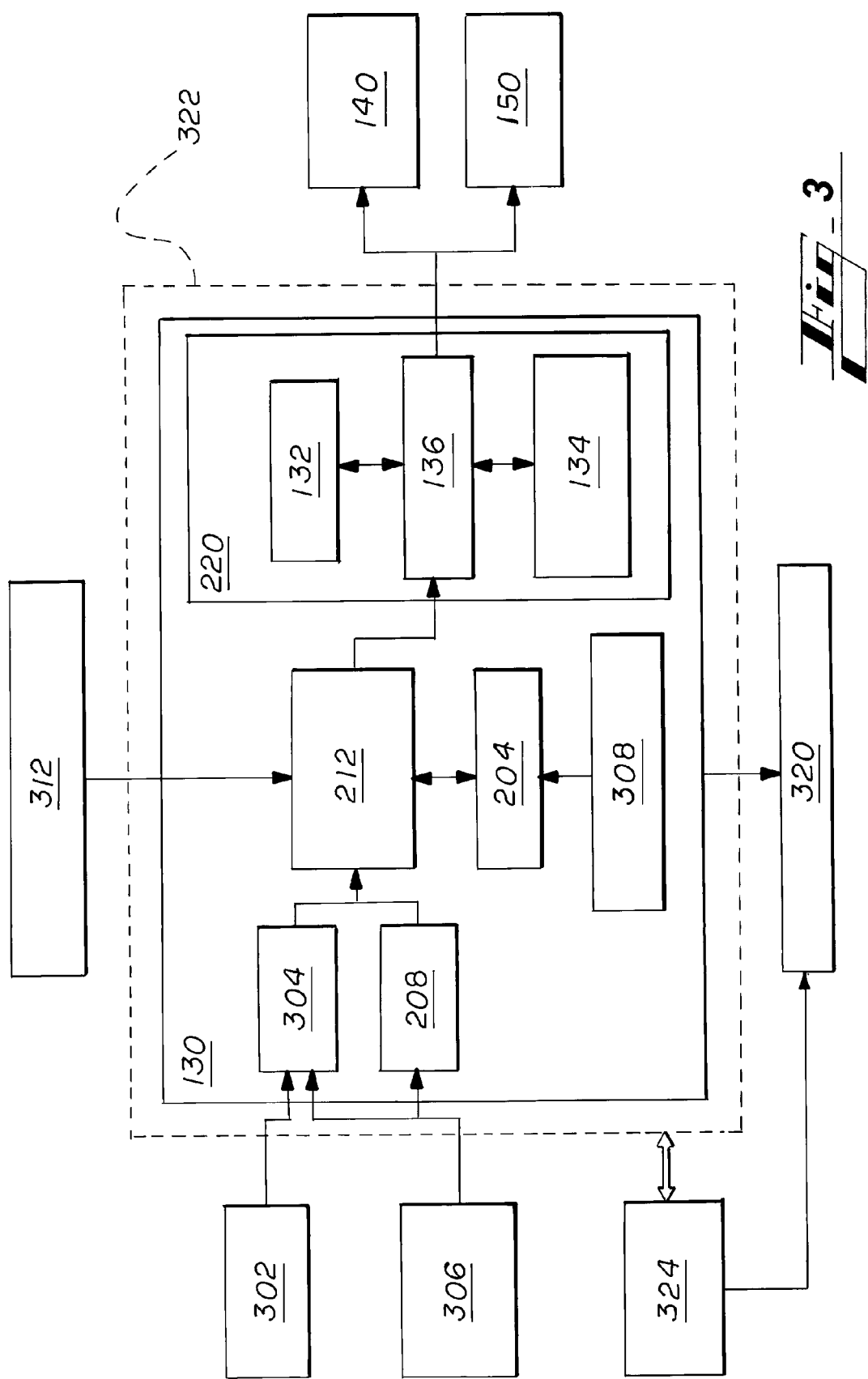
FIG. 3 illustrates in block diagram form a differential braking fail-safe control incorporated into a lane centering system, according to an embodiment of the present technology.

Reference is now made to FIG. 3, which illustrates further an example of a differential braking fail-safe control incorporated into a lane centering system, according to an embodiment of the present technology. FIG. 3 shows elements from FIGS. 1 and 2, such as lane centering system 130 with LC controller 212 and arbitration and supervisory control 212 (including LC steering controller system 132, LC differential braking controller 134, and supervisory function 136). FIG. 3 also shows EPS system 140, differential braking system 150, desired path estimation unit 204 and predicted path estimation unit 208 from FIG. 2, and additional elements. As referenced above, the differential braking system 150, for embodiments, described further below in which electrical park brake (EPBs) are used in vehicle steering, includes, or includes functions of an EBCM.

In FIG. 3, lane detection sensor 302 may transmit lane sensing information (e.g., polynomial equations representing lane marks with respect to the vehicle center) to sensor fusion unit 304. U.S. patent application Ser. No. 12/143,439 entitled "PATH GENERATION ALGORITHM FOR AUTOMATED LANE CENTERING AND LANE CHANGING CONTROL SYSTEM," and U.S. patent application Ser. No. 12/399,317 entitled "MODEL BASED PREDICTIVE CONTROL FOR AUTOMATED LANE CENTERING/CHANGING CONTROL SYSTEMS," both assigned to the assignee of this application and both incorporated in their entireties herein by reference, disclose systems and methods for generating and providing lane sensing information.

Sensor fusion unit 304 also may receive information from other vehicle sensors 306 (e.g., speed meter readings, yaw rate data and steering sensor readings). Sensor fusion unit 304 may generate from the received information a lane path estimate (including, for example, estimations of lane curvature, lane width, offset value to lane center, and heading angle). This information may be forwarded to desired path generation unit 204 (e.g., via LC controller 212).

Desired path generation unit 204 may use the received information along with further lane centering elements 308, such as lane offset control information (which may include a lane offset is the command from the driver—driver may want to be 10 cm off from the lane center) and lane fork management information (e.g., information which indicates if the lane splits into two lane or the lane merges with the adjacent lane) to provide to LC controller 212 a desired path. Desired path may be provided in terms of coordinates and a heading, such as $(x_{Desired}, y_{Desired}, \theta_{Desired})$, showing the desired position and heading for this instant.

LC controller 212 may also receive predicted path information, in addition to desired path information. Vehicle sensor information 306 may also be received by predicted path generation unit 208, which may provide to LC steering controller 132 a predicted vehicle path (e.g., in coordinates such as $(x_{Desired}, y_{Desired}, \theta_{Desired})$ showing the predicted position and heading for this instant) and also information for a predicted state of the vehicle, such as predicted vehicle speed. Using this desired and predicted path information, LC controller 212 may generate yaw moment values to be used by either LC steering controller 132 or LC differential braking controller 134.

In this example, before any failure of the steering system, LC steering controller 132 may use the yaw moment information (based on desired and predicted path) to generate steering commands for lane centering (e.g., a steering angle ($\delta$), which may be forwarded to EPS system 140, via supervisory function 136. Human-machine interface (HMI) unit 312 may detect whether the driver is holding the steering and forward commands from the vehicle operator such as a steering override command and a steering override end command. The override command may, for example, halt the output of steering commands for lane centering by LC steering controller 132.

Supervisory function 136 may monitor the status of EPS system 140, and in the event of EPS system 140 failure, supervisory function 136 may switch control within lane centering system 130 to LC differential braking controller 134, which may, for example, then, in the event of EPS system 140 failure, receive yaw moment data and send braking commands to differential braking system 150 (via supervisory function 136) to, for example, maintain the desired path of the lane centering function (e.g., in performing a lane change or maintaining centering in a lane).

Differential braking controller 134 may use yaw moment data (e.g., generated from desired path and predicted path information) to find a sequence of braking commands for the available wheels of the vehicle on a time interval that minimizes the difference between the desired path and the predicted path of the vehicle. In such an example where the electrical power steering (EPS) system 140 has failed, the steering-based lane centering controller system (e.g., 132) may not use desired path and predicted path to generate steering commands (such as commands for steering angle ($\delta$)).

In the example of FIGS. 2 and 3 it is shown that yaw moment data is generated by LC controller 212 and passed either to LC steering controller 134 or LC differential braking controller 134, depending on the state of EPS system 140. It is noted here that in other examples it may be possible to incorporate the functions of the LC controller 212 into LC steering controller 134. For example, if a fail-safe mechanism for lane center control was incorporated into a lane centering system that did not use yaw moment for lane centering, the fail-safe mechanism may still be used by incorporating the yaw moment generation function of LC controller 212 into the LC differential braking controller 134. Other configurations for yaw moment generation and differential braking control functions are also possible.

In operation, LC differential braking controller 134 may determine a braking force for the vehicle wheels (e.g., wheels 102-108, FIG. 1), based on a determined or received yaw moment value, where the braking force determined replicates the yaw moment. As yaw moment values are further determined or received, LC differential braking controller 134 may generate a stream of braking force commands to be applied to the wheels of the vehicle.

In this example it is noted that, when the steering system has failed, EPS system 140 may not be able to accept a steering command for the steering angle ($\delta$) and, in the event of such a failure, other functions may be used for maintaining lane centering control, such as differential braking. In some examples, where EPS system 140 has failed, the steering response in the wheels may be extremely stiff or locked and the steering angle also may be incapable of changing or very difficult to change. Though in such an example, EPS system 140 is not capable of changing the steering angle, a steering sensor (part of vehicle sensors 306) may be provided to read the steering angle. Thus, in such an example, even though the electrical power steering (EPS) system can fail, it may be assumed that the steering angle ($\delta$) is still measurable for purposes of determining values such as yaw moment.

In one embodiment of the present technology, the elements of lane centering system 130 (e.g., 132, 134, 136, 204, 208, 212, 220, 304, 308 shown in FIG. 3) may be software elements, elements of executable computer program code, executed by processor 320. In FIG. 3, memory 322 includes programming modules (of executable software) of lane centering system 130. Each of the modules (e.g., 132, 134, 136, 204, 208, 212, 220, 304, 308) when executed by processor 320, may perform processes described herein, for example. Processor 320 may be a general purpose (e.g., PC-type) processor, configured for operation in an in-vehicle computer system or processor 320 may be specialized processor designed to execute the functions of lane centering system 130. Processor 320 may be a single processor or incorporate a number of processors and be capable of distributed processing and/or parallel processing.

Memory 322 may include for example processor memory such as random-access memory (RAM) or other memory accessible and useable by processor 320 to execute the programming stored in memory 322. Additionally, the elements of lane centering system 130 (e.g., 132, 134, 136, 204, 208, 212, 220, 304, 308) may be maintained on storage 324 (from which each of the modules 132, 134, 136, 204, 208, 212, 220, 304, 308 of lane centering system 130 may be downloaded and installed (e.g., to memory 322), which may include disk or server storage, portable memory such as compact disk (CD) memory and/or DVD memory and system memory, such as a hard drive or solid state drive (SSD) on which modules 132, 134, 136, 204, 208, 212, 220, 304, 308 may be installed. For example, stored instructions for performance of functions of lane centering system 130 (e.g., 132, 134, 136, 204, 208, 212, 220, 304, 308) and the processes described herein may be downloaded for execution by a computer processor of a vehicle, such as processor 320.

Although lane centering system 130 (e.g., 132, 134, 136, 204, 208, 212, 220, 304, 308) may be software elements, in one example, in another example (not shown), one or more of the elements of lane centering system 130 may be implemented in circuitry as computer hardware elements.

Figure 4:
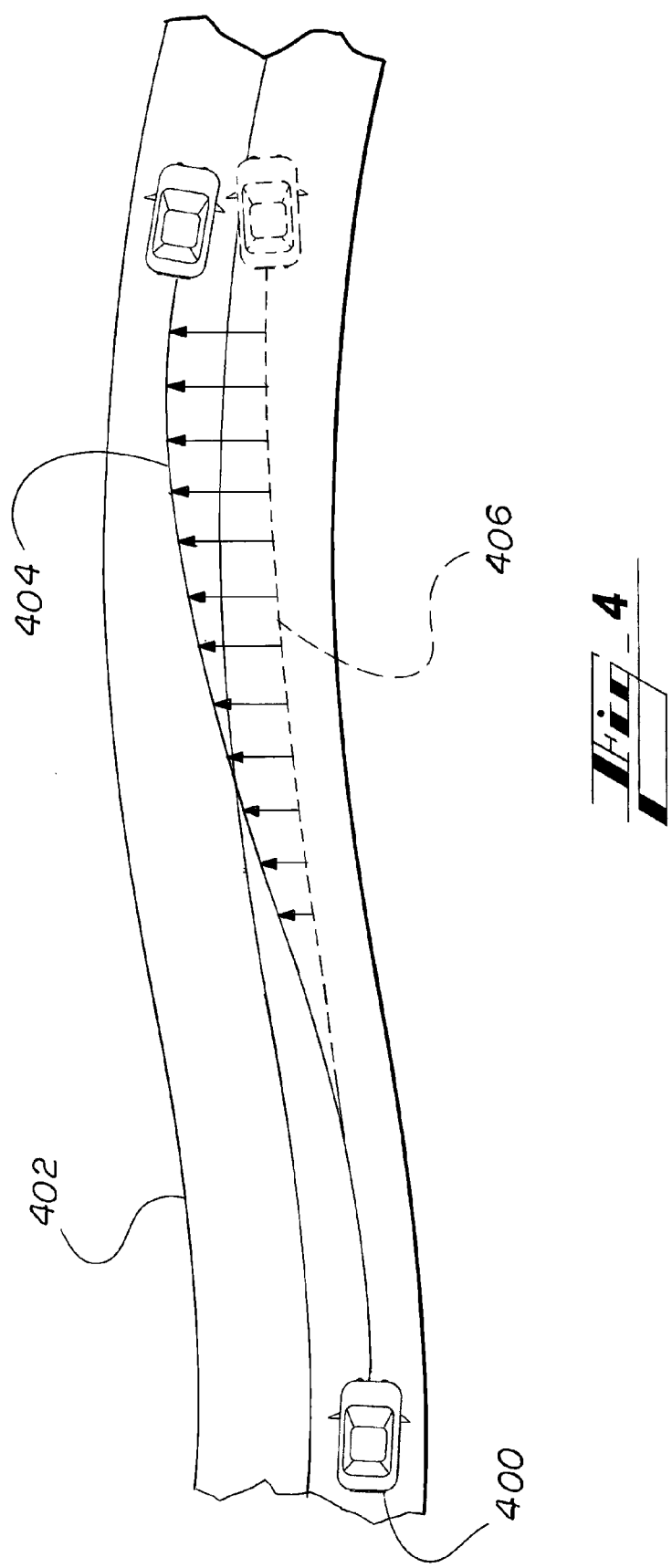
FIG. 4 illustrates a vehicle traveling on a roadway showing a desired path and a predicted path for determining a yaw moment, according to an embodiment of the present technology.

Reference is now made to FIG. 4, which illustrates vehicle 400 traveling on roadway 402 showing a desired path 404 and a predicted path 406 in connection with the process or determining a yaw moment, according to an embodiment of the present technology. For example, desired path generation unit 204 (in FIGS. 2 and 3) may generate desired path 404 (e.g., in coordinates such as $x_{Desired}$, $y_{Desired}$, $\theta_{Desired}$), and predicted path generation unit 208 (in FIGS. 2 and 3) may generate predicted path 406 (e.g., in coordinates such as $x_{Predicted}$, $y_{Predicted}$, $\theta_{Predicted}$). The points ($x_{Desired}$, $y_{Desired}$, $\theta_{Desired}$), ($x_{Predicted}$, $y_{Predicted}$, $\theta_{Predicted}$) may be considered as corresponding to each other, as shown by the arrows in FIG. 4 where the coordinates for each of the desired and predicted paths represent points on each of the curves for desired path 404 and predicted path 406, respectively.

Figure 5:
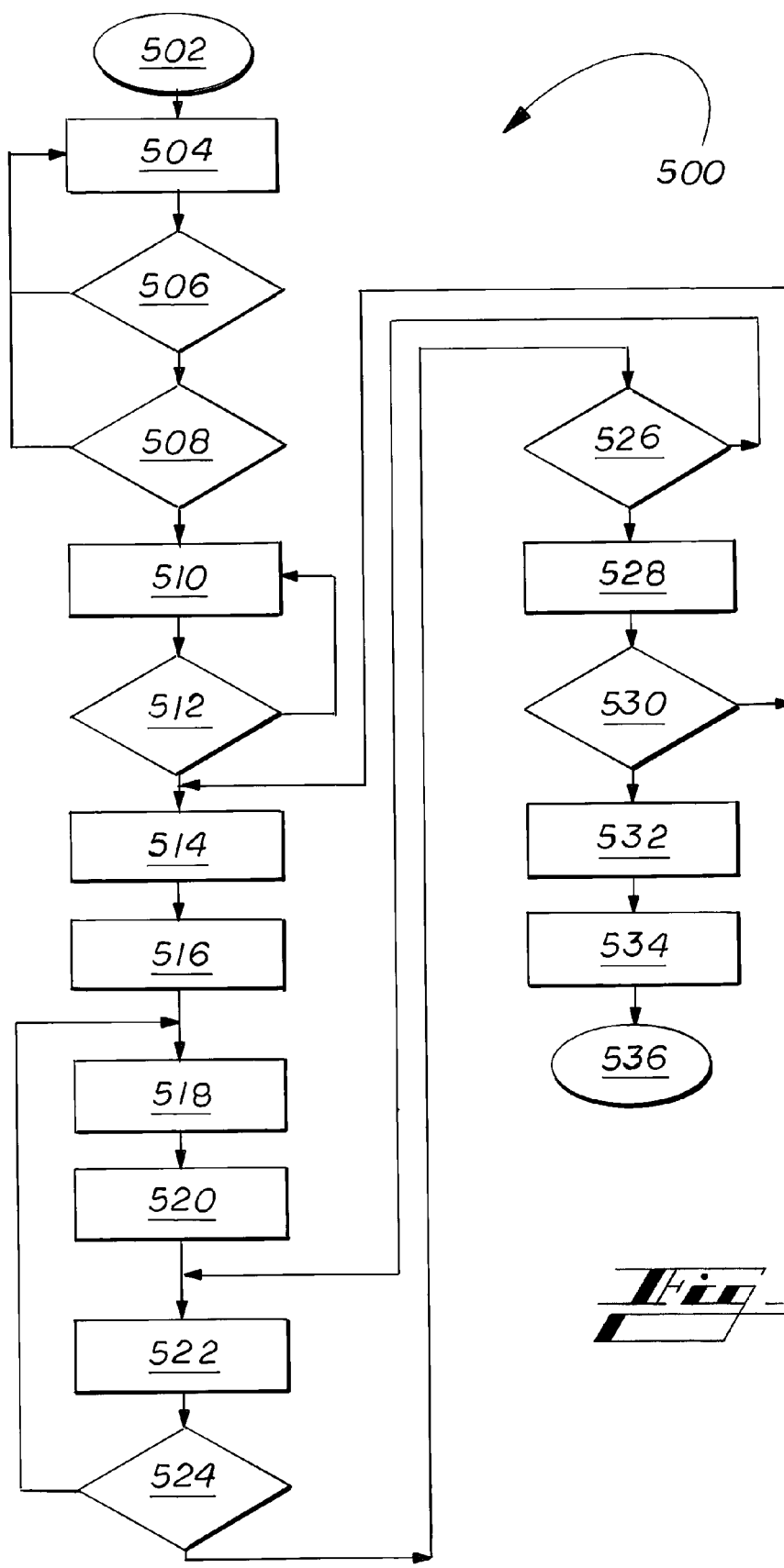
FIG. 5 illustrates a process flow for a differential braking fail-safe control, according to an embodiment of the present technology.

Reference is now made to FIG. 5, which illustrates an exemplary flow for a process 500 for fail-safe control using differential braking for a lane control system, according to an embodiment of the present technology. Steps 502-510 of the process 500 may be, for example executed by a processor (such as processor 320 in FIG. 3) in performing a lane centering control system engaging function via, for example, the programming of lane centering system 130 including, for example, LC controller 212, supervisory function 136, LC steering controller 132, and LC differential braking controller 134.

In step 502, process 500 begins and in step 504 the processor, for example as a default, may disengage lane centering system 130. In step 506, process 500 may determine if the driver has requested (e.g., through human-machine interface 312) a lane change function. If in step 506, the driver did not request a lane change function, process 500 returns to step 504. If the driver did request a lane change function, process 500 may proceed to step 508 to determine if lane centering system 130 is available for operation. Lane centering system 130 may not be available or on-line because of, e.g., a power failure, processor failure or other failure.

If in step 508, process 500 determines that lane centering system is not available, process 500 may return to step 504 (e.g., waiting for another driver request for a lane centering function).

If in step 508 process 500 determines lane centering system 130 is available, process 500 in step 510 may engage lane centering processes, such as desired path estimation (e.g., from desired path generation unit 204), predicted path estimation (e.g., from predicted path generation unit 208), LC controller 212, and arbitration and supervisory control 220 (including LC steering controller 132).

In step 510, LC controller 212 may generate yaw moment values based on inputs of desired path and predicted path (see, e.g., FIGS. 2 and 3) and LC steering controller 132 may use those yaw moment values to control the steering angle of the vehicle via commands to EPS system 140 and move the vehicle to the determined lane center, such as for example in response to a lane centering request (and center the vehicle in the lane as it moves).

In step 512, process 500 may determine whether or not the electric steering has failed. For example, processor 320, executing supervisory function 136, may monitor the status of EPS system 140 (e.g., with supervisory function monitoring EPS system 140 on a separate processing thread). If in step 512, process 500 determines EPS system 140 has not failed, processor 320, for example executing supervisory function 136, may not intervene, and processor 320 may allow the function of LC steering controller 132 to remain engaged. If in step 512 process 500 does determine that a failure of EPS system 140 has occurred, processor 320, e.g., executing supervisory function 136, may switch processing control from LC steering controller 132 to LC differential braking controller 134. LC differential braking controller 134 may, for example, send commands to differential braking system 150 to control the vehicle and, for example maintain the desired path of the lane centering function (e.g., in performing a lane change or maintaining centering in a lane).

When supervisory function 136 has switched control to LC differential braking function, LC controller 212 may continue to generate yaw moment values. In such an example, processor 320, e.g., executing LC controller 212, may receive in step 514 data concerning a desired path generation. In step 516, processor 320, e.g., executing LC controller 212, may receive vehicle path prediction information. Processor 320 in step 518, e.g., executing LC controller 212, may calculate a yaw moment value for lane control. The yaw moment values calculated in each instance may be passed to LC differential braking controller 134 (e.g., for determining the differential force to be applied to the wheels).

In another example (not shown), the functions of LC controller 212, for calculating yaw moment values may be incorporated into LC differential braking controller 134, and in such an example steps 514, 516 and 518 may be performed by processor 320 executing LC differential braking process 134 alone. Other processing configurations are also possible.

In determining yaw moments in step 518 of process 500, processor 320 may calculate a yaw moment ($\Delta\tau$) value according to a cost function that minimizes the vehicle's desired path and predicted path. One example cost function which may be used is:

$$J = \int_0^{\Delta T} \left\{ [y \;\; \varphi]_{err} \cdot Q(t) \cdot \begin{bmatrix} y \\ \varphi \end{bmatrix}_{err} + \Delta\tau \cdot R(t) \cdot \Delta\tau \right\} \quad \text{(Equation 1)}$$

where:
$y_{err}$ equals the lateral offset error between desired and predicted paths ($=y_{desired}-y_{predicted}$);
$\varphi_{err}$ equals the vehicle heading angle error between desired and predicted paths ($=\varphi_{desired}-\varphi_{predicted}$); and
Q(t) and R(t) may provide weighting factors, which may be tuned, for example, through vehicle dynamics simulation or vehicle testing.
Q(x) may be a function describing how quickly movement from actual/predicted path to desired path should occur. A small Q(x) value may indicate a slow, or gradual movement to the desired path. A large Q(x) value may indicate a desire for a quick movement to the desired path. R(t) may be a function that provides a reciprocal weighting factor to the yaw moment ($\Delta\tau$) that balances with Q(x). For example, a quick movement to the desired path may require a large yaw moment ($\Delta\tau$) and hence the weighting based on R(t) may be small.

In this equation J (the cost) may be found as a minimum of an integral over the time period from zero (0) to $\Delta T$ (a time period such as 3 seconds, which may be changed or tuned). The equation of the integral may take the lateral offset and heading angle differences (or errors) between the desired and predicted paths and weight them by the Q(x) factors such as (quickness in terms of amount of movement from actual/predicted path to desired path). The cross product of the lateral offset and heading angle differences may then be added to a variable for the yaw moment value, which in this example, is weighted by R(t) factors, (e.g., to balance the yaw moment ($\Delta\tau$) to the speed of the movement desired between actual/predicted path and desired path).

Values of $y_{err}$ and $\phi_{err}$ may be determined in the cost function from the values of ($y_{Desired}$, $\theta_{Desired}$) and ($y_{Predicted}$, $\theta_{Predicted}$) of the desired and predicted paths. In lane centering case, for example, $y_{Desired}$ is the distance from the vehicle center to the lane center, and $\theta_{Desired}$ is the heading angle of the vehicle to the lane center.

The weighing factors Q(x) and R(t) may be pre-determined values e.g., determined through vehicle dynamics simulation or vehicle testing. The value of ($\Delta\tau$) which gives the lowest value of J in the cost function may be the yaw moment value determined in step 518.

In step, 520, process 500 may determine a total braking force value for the wheels using the yaw moment value. As stated, in one example of an embodiment of the present technology, the total braking force value may be calculated for application on the wheels of either the right-hand side (RHS) of the vehicle ($F_{Total\ RHS}$) or the left-hand side (LHS) of the vehicle ($F_{Total\ LHS}$).

A positive or negative value or sign (+/−) of the yaw moment ($\Delta\tau$) may direct that the vehicle executing the fail-safe procedure be turned in either a clockwise or counter-clockwise direction. If the yaw moment ($\Delta\tau$) is zero, the yaw moment may determine that the vehicle may not be turned at all.

For example, according to on convention, a yaw moment ($\Delta\tau$) that is negative may indicate that the vehicle may need to turn in a clockwise direction to maintain desired lane centering. To turn the vehicle in a clockwise (CW) direction, it may be necessary to apply differential braking force to the right-hand side wheels, where very little or no braking force is applied to the left-hand side wheels.

Correspondingly, a yaw moment ($\Delta\tau$) that is positive may indicate that the vehicle may need to turn in a counterclockwise (CCW) direction to maintain desired lane centering. To turn the vehicle in a counterclockwise direction, differential braking force may need to be applied to the left-hand side wheels, where very little or no braking force is applied to the right-hand side wheels.

If yaw moment ($\Delta\tau$) is zero then no braking force may need to be applied.

Accordingly in step 520, the total force calculated from the yaw moment ($\Delta\tau$) may be determined for the front and rear wheels of either the right-hand side (for CW turning movement) or the left-hand side (for CCW turning movement). The total force value may then represent a total force to be allocated to a front and a rear wheel of the vehicle, for example where the front and rear wheel is on either the right-hand side or left-hand side of the vehicle (an example of an embodiment of the present technology may also be seen in vehicles with other wheel configurations, such as 3 wheeled vehicles, 8 or 16 wheeled vehicles). In the example of a four-wheeled vehicle, the total force may be determined by formulas such as the following. For clockwise (CW) movement, e.g., if the yaw moment ($\Delta\tau$) is negative, the formula may be:

$$F_{Total\ RHS}=\Delta\tau*2/w, \text{ if } \Delta\tau \text{ is CW (brake RHS).} \quad \text{(Equation 2)}$$

For counterclockwise (CCW) movement, e.g., if the yaw moment ($\Delta\tau$) is positive, the formula may be:

$$F_{Total\ LHS}=\Delta\tau*2/w, \text{ if } \Delta\tau \text{ is CCW (brake LHS).} \quad \text{(Equation 3)}$$

In the formulas above, the w value may be a constant (or predetermined value) representing the size of the vehicle's wheel base.

In step 522 of process 500, processor 320 may, based on the determined total force value for the wheels (the front and rear wheels of either the right-hand side (for CW turning) or the left-hand side (for CCW turning)), next determine a distribution ratio $\alpha$ between the front and rear wheels chosen. The distribution ratio may be determined to allocate portions of the total force value between the determined front and rear wheels (for example, based on a load value for the vehicle and a value representing lateral acceleration), wherein the ratio is a value between zero and one.

Determination of a value for the distribution ratio $\alpha$ in step 522 may depend on factors such as the loading (e.g., vertical load on the tire) and the lateral acceleration that is occurring. The distribution ratio $\alpha$ may be determined by formulas such as the following. For clockwise (CW) movement, e.g., if the yaw moment ($\Delta\tau$) is negative, the formula may be:

$$F_{Right\ front\ tire}=\alpha\Delta\tau*2/w; \text{ and} \quad \text{(Equation 4)}$$

$$F_{Right\ rear\ tire}=(1-\alpha)\Delta\tau*2/w. \quad \text{(Equation 5)}$$

For counterclockwise (CCW) movement, e.g., if the yaw moment ($\Delta\tau$) is positive, the formula may be:

$$F_{Left\ front\ tire}=\alpha\Delta\tau*2/w; \text{ and} \quad \text{(Equation 6)}$$

$$F_{Left\ rear\ tire}=(1-\alpha)\Delta\tau*2/w. \quad \text{(Equation 7)}$$

In the formulas above the w value may be a constant (or predetermined value) representing the size of the vehicle's wheel base. Also, the distribution ratio $\alpha$ may be some value between 0 and 1 (e.g., 0<$\alpha$<1).

In step 524, process 500 may next determine if the braking forces that are to be applied to the tires (e.g., combined with the steering force) are within the friction ellipses of the vehicle's tires (In this example, the steering force may be included in the friction ellipse analyses, because the steering angle before the failure may still generate a lateral force that may be included the limit of the friction ellipses). A friction ellipse for a tire, also known as a circuit of forces, traction circle or friction circle, may provide an indication of the maximum horizontal (along the road) force that may be generated with the particular tire.

The size of a friction ellipse for a tire or the amount of horizontal (along the road) force the tire may generate may be affected, in general, by aspects such as the design of the tire, the vertical load on the tire, tire wear condition, tire pressure, temperature of the tire road condition, etc. Process 500 may, for example, determine in steps 524 and 526 if the allocated force values for the front and rear wheels (when applying the force on either the right or left side) is within the friction ellipses for the tires of the front and rear wheels for the side in question. Where the allocated force values are not within the frictional ellipse (e.g., the force value allocated to the wheel is greater than the force that may be generated with the tire on the wheel), process 500 may make modifications to either the amount of force allocated (e.g., redistribute the found total force) or modify the yaw value (e.g., to generate a new total force).

In step 524 of process 500, processor 320, executing the processes of LC differential braking controller 134, may check to determine if the determined forces for the front and rear wheels of the vehicle side in question (right side or left side) are both out of the friction ellipses of the wheels.

If in step 524 the determined forces for the front and rear wheels are both out the friction ellipses for the wheels, processor 320 may return to step 518 to re-calculate the yaw moment (e.g., to generate a yaw moment with a smaller value) and then re-execute steps 520 and 522. For example, step 524 may include determining if the distribution of the total force value for the front wheel is within a friction ellipse for a tire of the front wheel, determining if the distribution of the total force value for the rear wheel is within a friction ellipse for a tire of the rear wheel and returning to step 518 to modify or re-calculate the yaw moment value if neither of the front and rear wheels are within their friction ellipse. Re-calculating the yaw moment value may include determining a smaller value by subtracting a pre-determined amount.

If in step 524, processor 320 determines at least one of the allocated forces (for the front and rear wheels) is within the friction ellipse for the wheel, then processor 320 may proceed to step 526. In arriving at step 526, either one or both wheels (on either the right or left side of the vehicle) have been allocated a force value that is within (or less than), for example, the maximum force allowable by the friction ellipse of the tires for the wheels in question.

In step 526, processor 320, executing the processes of LC differential braking controller 134, may check this time to determine if the determined forces for the front and rear wheels are both within the friction ellipses of the corresponding wheels. For example, if in step 526 both the front and rear wheels are within their friction ellipses, then processor 320 may proceed to step 528 (and run/send commands to the differential braking system).

If only one of the wheels is within its respective ellipse, then processor 320 may return to step 522 to re-determine the distribution ratio of the total force being applied the wheels (for example adjusting the distribution ratio α by a pre-determined amount proportional to the percentage of the exceeding force of the wheel that is outside the friction ellipse) and then re-executing step 524 and 526. If in step 526 processor 320 determines both allocated forces (for the front and rear wheels) are within the friction ellipses for the wheels in question, then processor 320 may proceed to step 528.

In step, 528 of process 500, processor 320 may then apply the calculated forces for the front and rear wheels (of either the right-hand or left-hand side of the vehicle) and maintain a course for the vehicle that follows the desired path for the lane change function. As stated, application of the braking force on the front and rear wheels of the vehicle based on the total force value, may cause either a clockwise or counterclockwise change in the heading of the vehicle (e.g., depending on the sign of the yaw moment ($\Delta\tau$)).

In step, 530 of process 500, processor 320 may determine if the driver is controlling the steering of the vehicle. The driver's control may be indicated, for example, by human-machine interface unit 312, such as, for example, if the driver provides a command to override the power steering, which may be registered, for example by supervisory function 136 and communicated to LC differential braking controller 134 (and LC steering controller 132). If in step 530, driver is not in control of the steering for the vehicle, process 500 may return to step 514, where steps 514 to 530 may be repeated to continue maintaining the vehicle on the desired path for the lane change function.

If in step 530, the driver is in control of the steering function for the vehicle, processor 320 may proceed to step 532 to disengage lane centering system 130, and in step 534 processor 320 may disengage differential braking control function (e.g., and terminate all functioning of lane centering system 130). The process 500 may terminate in step 536.

Figure 6:
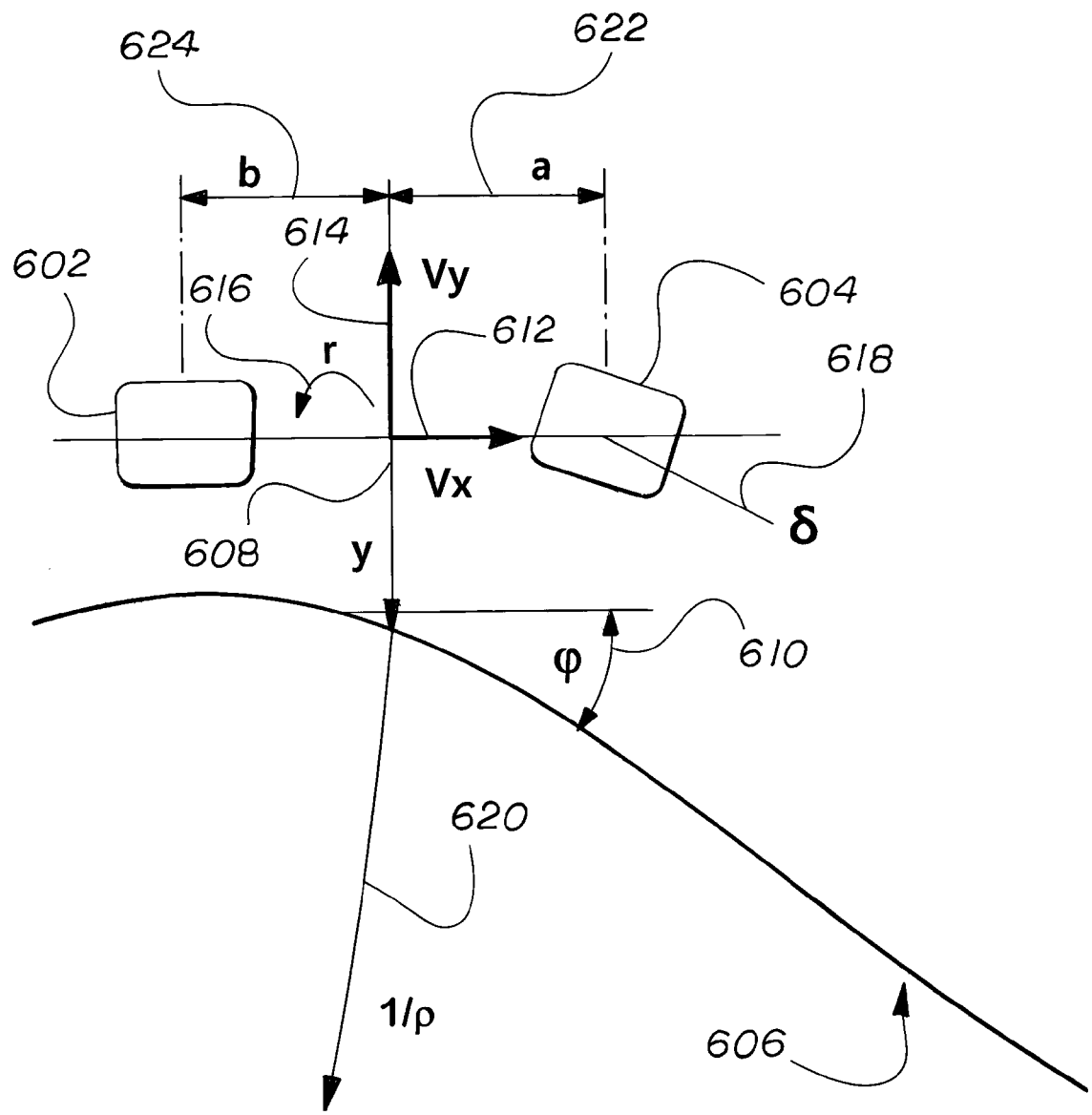
FIG. 6 illustrates lateral dynamics of a vehicle position in relation to a lane center, according to an embodiment of the present technology.

Reference is now made to FIG. 6 which shows lateral dynamics of a vehicle position (of a vehicle having wheels 602, 604) in relation to a lane center according to an embodiment of the present technology. FIG. 6 depicts the lane center 606 to be followed in a lane centering function. The value y 608 corresponds to the predicted lateral position with respect to the current vehicle center for use in determining future lateral position in relation to the current vehicle pose.

The identifier φ, 610 represents an orientation angle of the vehicle with respect to the current vehicle center. The identifier $v_x$, 612 represents a value for vehicle longitudinal speed. A $v_y$, 614 represents vehicle lateral speed. An r value 616 represents a vehicle yaw rate. A δ value 618 represents a steering angle. A ρ value 620 (shown in FIG. 6 as 1/ρ represents a value for road curvature. Using such values, lateral dynamics of the vehicle may be described by a formula such as:

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2 C_f + b^2 C_r}{Iv_x} \end{bmatrix} \cdot$$

$$\begin{bmatrix} y \\ \varphi \\ v_y \\ r \end{bmatrix} + \begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho + \begin{bmatrix} 0 \\ 0 \\ 0 \\ 1/I \end{bmatrix} \cdot \Delta\tau$$

(Equation 8)

In some embodiments, there is no rho term (ρ), or the term can be considered equal to 0.

In addition to the values identified above y, φ, $v_x$, $v_y$, r, δ, ρ, the value a 622 represents a distance (based on the chassis of the vehicle) from the vehicle's center of gravity to the front axle of the vehicle and b 624 represents a distance from the center of gravity to the rear axle of the vehicle. The values $C_f$ and $C_r$ are parameters representing a stiffness of the front wheels 604 and of the rear wheels 602 of the vehicle, respectively.

Reference is now made to FIGS. 7 and 8, which illustrate clockwise and counterclockwise differential braking based on a yaw moment value, according to an embodiment of the present technology.

FIG. 7, shows yaw moment ($\Delta\tau$) 711 caused by differential braking forces 712, 713 applied to right front wheel 714 and right rear wheel 715 of vehicle 710. As described further below in more detail, in some embodiments, the differential braking includes application of the electrical park brake (EPB), on the appropriate side (left/right) of the vehicle, which is referenced schematically in FIG. 7 by arrow numbered 717.

The forces causing yaw moment (Δτ) 711 may rotate vehicle 710 in a clockwise direction (e.g., as the vehicle is viewed from overhead, looking toward the ground).

FIG. 8, shows yaw moment (Δτ) 721 caused by differential braking forces 722, 723 applied to right front wheel 724 and right rear wheel 725 of vehicle 720. The forces causing yaw moment (Δτ) 721 may rotate vehicle 720 in a counterclockwise direction (e.g., as the vehicle is viewed from overhead, looking toward the ground). Again, and as described further below in more detail, in some embodiments, the differential braking includes application of the electrical park brake (EPB), on the appropriate side (left/right) of the vehicle, which is referenced schematically in FIG. 8 by arrow numbered 727.

III. Fusion of Electrical-Park & Hydraulic Brake Systems

Figure 9:
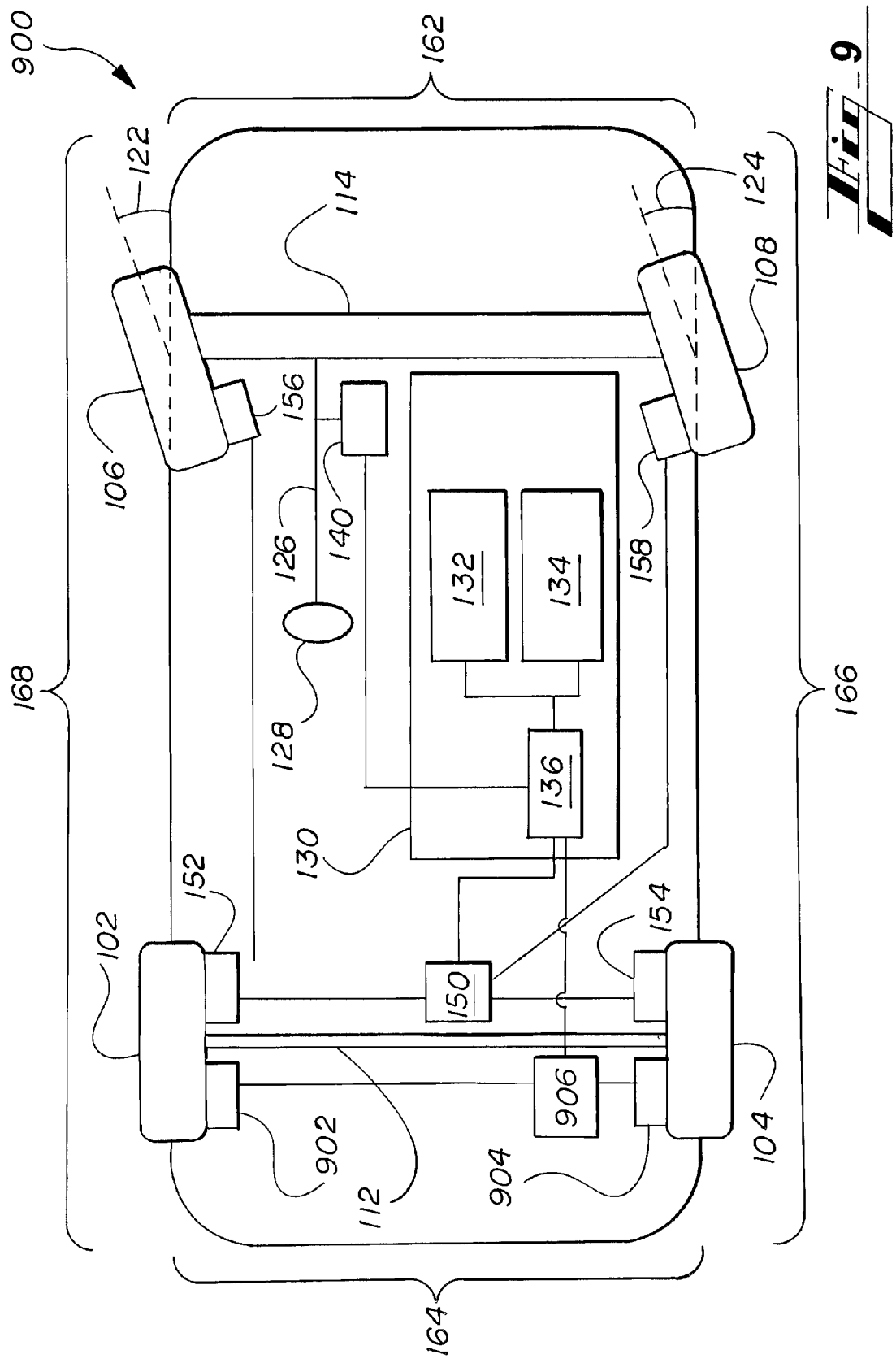
FIG. 9 illustrates a vehicle, according to another embodiment, including electrical park brakes (EPB) in addition to hydraulic brakes.
Figure 10:
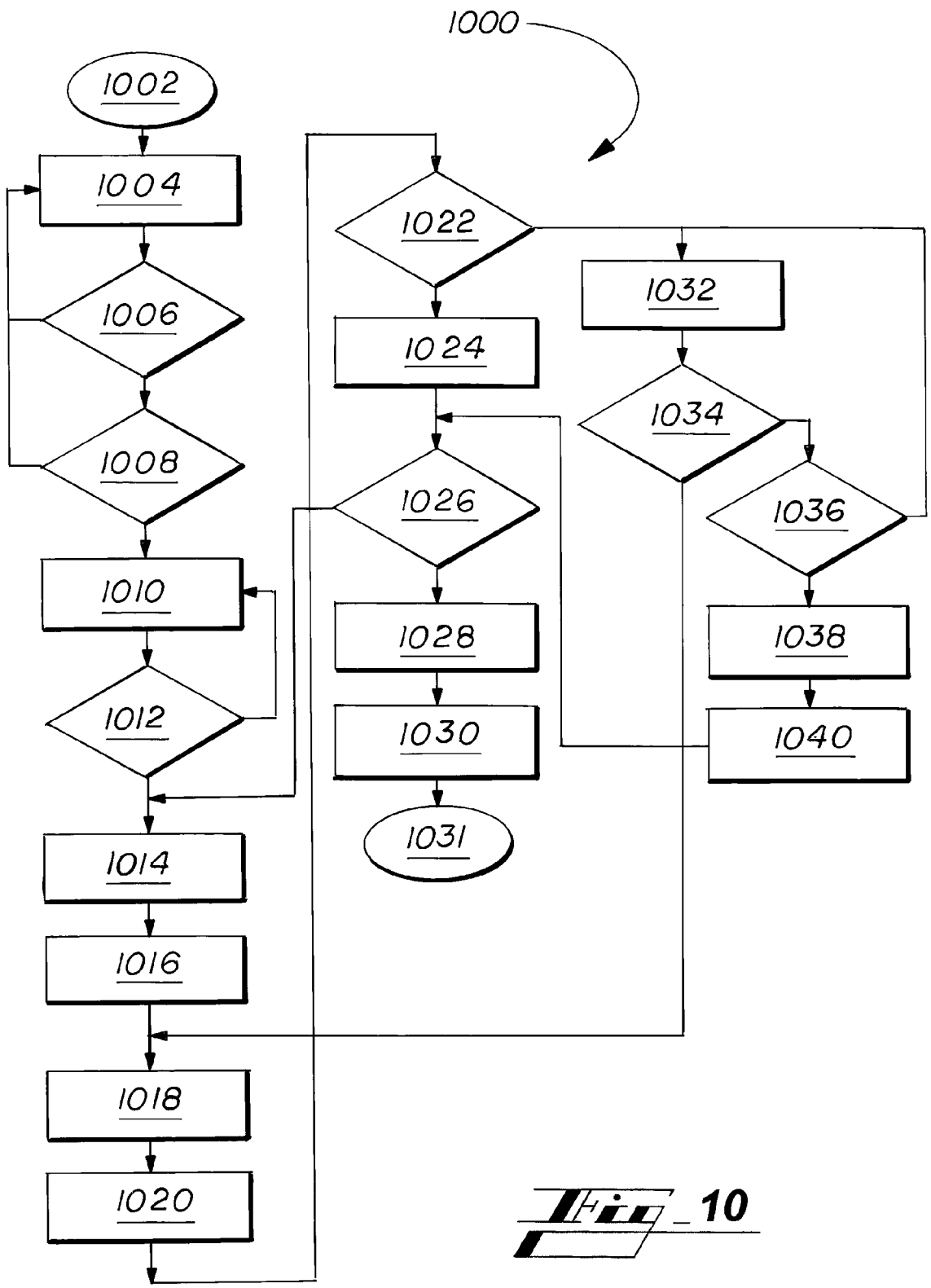
FIG. 10 illustrates a process flow for differential braking control using selectively electrical park brakes (EPBs) and hydraulic brakes.

FIGS. 9 and 10

In some embodiments of the present technology, vehicle dynamics is controlled using selectively electrical park and hydraulic brake systems of the vehicle.

FIG. 9 shows an example vehicle 900 including left and right rear electrical park brake systems 902, 904. The electrical park brake (EPB) systems 902, 904 can be referred to by other names, as well, such as electrical parking brake systems, EPB systems, EPBS, electrical emergency brake systems, EEB systems, EEBS, etc.

While only two EPB brakes, one for the left rear wheel and one for the right, is typical on most vehicles, the present technology is not limited to this arrangement. It is contemplated, for example, that the vehicle includes electrical park brakes (EPBs) in the left and right fronts, in addition to or instead of the left and right rears, and the operations described herein in connection with the EPBs can be extended to control vehicle dynamics using the EPBs present.

Each system 902, 904 is separately actuatable, such as signal from the differential braking controlling system 150, EPB controller 906, and/or supervisory control 136. In some embodiments, each includes an actuator assembly, such as a 120W motor, configured and arranged to cause at least one brake pad to engage a brake surface, such as a drum or disc brake surface (parts not shown in detail). In a particular embodiment, the actuator is configured to, via spindle and piston assemblies, e.g., engage a caliper assembly that in turn causes the one or more brake pads to engage the brake surface.

The vehicle 900 of FIG. 9 can otherwise be identical to the vehicle 100 described above in connection with FIG. 1. Similarly, the vehicle 100 can include electrical park brake systems 902, 904.

FIG. 10 shows an exemplary method 1000 for controlling vehicle dynamics using the electrical park 902, 904 and hydraulic brake (HB) systems (HBS) 152, 154, 156, 158 of the vehicle, selectively, according to the present disclosure. The hydraulic brake systems can be referred to also as service brake systems (SBS), and is not limited to hydraulic style brakes. In one contemplated embodiment, they may include electronic brakes.

Benefits of using the EPB systems in the vehicle LC process can include faster response, or actuation, time, and increased accuracy, as the EPB systems actuate faster than hydraulic systems, for instance, and are controllable to a higher degree of accuracy—i.e., finer control. An ancillary benefit associated with implementing the EPB systems is that it will already be planned for all or most all modern vehicles, such as those having LC control for autonomous driving, to have electrical parking brakes. As such, cost increase associated specifically with implementing the present differential braking arrangement fusing selectively the EPB and HBS is kept down because the needed braking hardware, and perhaps most or all basic software, will already be accounted for.

It should be understood that the steps of the method 1000, as with the method 500 of FIG. 5, are not necessarily presented in any particular order and that performance of some or all the steps in an alternative order is possible and is contemplated. And the steps have been presented in the demonstrated order for ease of description and illustration. Steps can be added, omitted and/or performed simultaneously without departing from the scope of the appended claims. It should also be understood that the illustrated methods 1000, 500 can be ended at any time.

In certain embodiments, some or all steps of the processes, and/or substantially equivalent steps are performed by one or more processors executing computer-executable instructions stored or included on a computer-readable medium, such as the storage mediums and processors described above. Steps can be performed, for instance, by the processor 320 in FIG. 3, in connection with lane-centering control system functions, executing programming of the lane centering system 130 including, for example, the LC controller 212, the supervisory function 136, the LC steering controller 132, and the LC differential braking controller 134.

Many operations of the method 1000 of FIG. 10 are the same as or similar to corresponding operation of the method 500 of FIG. 5. In describing the method 1000 of FIG. 10, below, reference is at times made to the corresponding operations of FIG. 5.

The method 1000 begins 1002 and flow of the algorithm proceeds to block 1004, whereat the processor either disengages the lane centering system 130 or simply does not engage it, leaving the system 130 disengaged, which may be a default state. This operation 1004 is like step 504 of method 500.

At decision diamond 1006, like step 506, the processor determines whether the driver has requested a lane change function, such as via the human-machine interface 312.

If in step 1006, the driver did not request a lane change function, algorithm returns to step 1004. If the driver did request a lane change function, flow of the algorithm proceeds to decision diamond 1008 wherein the processor determines whether the lane centering system 130 is available for operation. The lane centering system 130 may be unavailable or off-line because of, for example, a power failure, processor failure, or other failure.

If in step 1008, it is determined that lane centering system is not available, flow of the algorithm 1000 returns to operation 1004—e.g., waiting for a driver request for a lane centering function.

If in step 1008, however, the processor determines lane centering system 130 is available, the processor in block 1010 engages the system 130 for performance of lane centering processes, such as desired path estimation (using, e.g., the desired path generation unit 204), predicted path estimation (using, e.g., predicted path generation unit 208), LC controller 212, and arbitration and supervisory control 220 (using, e.g., the LC steering controller 132).

As part of the operation 1010, the LC controller 212 in some embodiments determines one or more yaw moment values Δτ based on inputs of desired path and predicted path. Also in the operation 1010, the LC steering controller 132 may use the yaw moment values Δτ to determined a steering angle. The steering angle is determined for controlling steering of the vehicle, via commands to the EPS system 140, to move the fore-aft centerline of the vehicle to or at least toward a target determined lane center.

The target lane center would be the center of a present lane for lane centering in which lane is not changed and would be a center of another lane, e.g., adjacent lane to the left or to the right, for a lane changing type of lane centering. The operation 1010 can be like corresponding step 510 of FIG. 5.

From operation 1010, flow of the algorithm proceeds to decision diamond 1012 in which the processor determines whether the electric steering has failed. The processor 320 may, e.g., executing supervisory function 136, monitor a status of the EPS system 140. As with any operation described, herein, the monitoring may be performed on a separate processing thread.

If in decision 1012, the processor determines that the EPS system 140 is operating normally, i.e., has not failed, the processor (e.g., the processor 320 executing the supervisory function 136) does not interfere with normal steering control for lane centering performed at block 1010. The decision 1012 can be like step 512 of FIG. 5.

If it is determined in decision 1012 that a failure of the EPS system 140 has occurred, flow of the algorithm proceeds to operation 1014. This transition may include the processor 320, executing supervisory function 136, e.g., transferring processing control from the LC steering controller 132 to the LC differential braking controller 134. The LC differential braking controller 134 may, for example, send commands to the differential braking system 150 to control the vehicle to approach the desired vehicle path.

In one embodiment, though the supervisory function 136 has switched control to the LC differential braking function, the LC controller 212 continues to generate yaw moment values.

The processor in operation 1014 receives data indicating the desired path and generates representation of the desired path. The operation may be like the corresponding step 514 of FIG. 5.

From operation 1014, flow of the algorithm proceeds to operation 1016, wherein the processor (e.g., processor 320, executing functions of the LC controller 212) receives vehicle path prediction information.

From operation 1016, flow proceeds to operation 1018, whereat the processor (again, e.g., the processor 320 executing functions of the LC controller 212) calculates a yaw moment value $\Delta\tau$ for lane control. The yaw moment value calculated is passed to the LC differential braking controller 134, which may in turn determine a differential force to be applied to the wheels via the appropriate brake or brakes.

In one embodiment, the functions of the LC controller 212, for calculating yaw moment values $\Delta\tau$, are incorporated into LC differential braking controller 134. In this case, operations 1014, 1016, and 1018 may be performed by the processor, e.g., the processor 320, executing these functions of the LC differential braking controller 134. And, as described in connection with the algorithm 500 of FIG. 5, other processing configurations are also possible.

Determinations of yaw moments $\Delta\tau$ in operation 1018 can be like the determinations described above in connection with step 518 of the process 500 of FIG. 5. The determination may include, e.g., calculating a yaw moment value $\Delta\tau$, such as according to a cost function that minimizes the vehicle's desired path and predicted path. Other details, including an example cost function, are provided above in connection with step 518, and not repeated here for brevity.

With continued reference to the algorithm 1000 of FIG. 10, operation 1020 marks a first primary departure from the flow of the algorithm 500 of FIG. 5.

In operation 1020, the processor determines a sequence of the electrical parking brake (EPB) forces that would be needed over a period of time for approaching or reaching the desired vehicle position (e.g., lane centered). That is, the processor determines the EPB forces that would be needed over the period in order to minimize difference between the desired path for the vehicle and the predicted path for the vehicle.

The time period can be represented by $[0, \Delta T]$. If clockwise (CW) vehicle turning is needed during the time period to approach or reach the desired vehicle positioning (e.g., lane centered), the EPB forces that would be needed would be represented by EPB differential braking commands ($R_{rr\ EPB}$ (t)) for the right wheel, and EPB differential braking commands ($R_{rl\ EPB}$ (t)) for the left wheel if CCW redirection is needed.

According to one scheme, the previously-determined the yaw moment ($\Delta\tau$) is signed—i.e., positive (+) or negative (−), corresponding to the direction of the moment needed. Whether the left or right rear EPB 902, 904 is needed, for turning the vehicle CCW or CW, respectively, is in this case a function of the sign of the determined yaw moment ($\Delta\tau$).

The distinct braking commands during the period are provided in respective loops of the period, which can be referred to by other names such as sub-periods or repetitions.

In one embodiment, the operation 1020 of determining the sequence of the electrical parking brake (EPB) forces that would be needed over a period of time for approaching or reaching the desired vehicle position (e.g., lane centered) includes determining a total braking force ($F_{Total}$) needed to minimize the difference between the desired and predicted routes. The total braking force would need to be applied at either the left EPB or right EPB depending on the redirection needed, e.g., based on the sign of the determined yaw moment ($\Delta\tau$).

From operation 1020, flow of the algorithm 1000 proceeds to decision diamond 1022 whereat the processor determines whether the electrical parking brake—i.e., the EPB on the side of the vehicle on which turning is needed—is sufficient to provide the braking needed. When multiple braking commands are needed over the period $[0, \Delta T]$, as referenced above, an affirmative determination in the operation 1020 results only if the EPB can satisfy each of the needed brake force applications of the period.

In response to an affirmative determination at decision 1022, i.e., it is determined that the EPB system is sufficient to provide the needed braking force over the period, flow of the algorithm 1000 proceeds to block 1024, whereat lateral control is performed using the EPB system. The performance includes providing one or more braking commands for implementation at the appropriate EPB (left 902 or right 904).

The EPB commands indicate one or more braking force applications needed via the appropriate EPB (l/r), e.g., a distinct force application needed at the EPB for each of the multiple loop of the subject period. For illustration, the period could include one (1) second, and be divided into ten loops, or sub-periods. The braking command(s) can, thus, indicate ten (10) EPB braking forces (or eleven (11) if there is a command for both time zero (0) and the one (1) second point) to be effected in series, in order from a first to a final loop of the period. Other example periods in addition to 1 second include 2 seconds, 3 seconds, a value between these, or higher than 3 seconds. The loop can be any sub-set of the period, such as where each loop is 1/10th of the period, 1/20 of the period, etc.

Following provision of the appropriate EPB command(s) at operation 1024, for execution at the appropriate EPB system 902 or 904, flow of the algorithm can proceed to decision diamond 1026, whereat the processor determines whether the vehicle driver is controlling or wishes to control vehicle steering. Driver control or desire to control is determined based on, for example, a determination that the driver has begun using the steering wheel to control vehicle direction. In another example, driver control or desire to control is indicated by way of the human-machine interface unit 312, such as by, for example, the driver providing a command to override the power steering, which is in turn registered by the supervisory function 136.

In response to a negative determination at decision 1026, i.e., there is no indication that the driver would like to take over, flow proceeds to afore-described block 1014, whereby steps of the algorithm 1000 are repeated as needed to continue controlling vehicle direction using the brake systems.

In response to a positive determination at decision 1026, i.e., that the driver is controlling or wishes to now control the vehicle, flow proceeds to blocks 1028 and 1030, whereat the processor initiates disengagement of LC functions—i.e., functions of the LC system 130. In the first step 1028, the processor, for instance, communicates a corresponding command or other signal to the LC differential braking controller 134. The braking controller 134 in turn stops controlling vehicle direction. The operations in some embodiments include, in the same act 1028, or a separate act 1030, providing the same or a different corresponding command or signal to the LC steering controller 132, ensuring that the controller 132 does not attempt to (e.g., steps 530-534) described above in connection with the method 500 of FIG. 5.

At transition point 1031, the present performance of the process 1000 may end or be repeated.

Returning to decision diamond 1022, in response to an affirmative determination there, i.e., it is determined that the EPB system is sufficient to provide the needed braking force over the period, flow of the algorithm 1000 proceeds to block 1032. In the operation 1032, the processor determines which brakes on the subject side of the vehicle (left-hand side (LHS) brakes for CCW turning and RHS brakes for CW) are preferable for reaching the total braking force needed during the subject period (e.g., in connection with each loop of the multiple loops of the period).

For vehicles having hydraulic brakes at each of four vehicle wheels, and an EPB at only each rear wheel, e.g., the determination would include, then, determining preferred, or optimal, relative braking amounts, e.g., raw force values, or percentages of the total needed force, to be applied at each of three (3) brakes: the two RHS hydraulic brakes and the one RHS EPB, for CW vehicle turning, and vice versa for CCW turning.

The terms preferred, or optimal, are used here to emphasize the fact that while numerous, almost infinite, various distributions of the total required brake force to the available brakes (e.g., three RHS brakes or three LHS brakes) is possible, only one distribution is chosen. The computer-executable instructions are configured to consider one or more variables to identify the preferred distribution, or preferred balance, of brake forces to the applicable brakes. The same concepts apply to the functions of the process 500 of FIG. 5.

In one embodiment, the variables considered by the processor include one or more of (1) safety in the maneuver, (2) a weight distribution, or load value, of the vehicle, (3) locations of the respective brakes in the vehicle (e.g., with respect to a center of gravity of the vehicle, or a centerline of the vehicle), (4) wear on the respective brakes (e.g., to limit too much wear on any one pad or pad set, and/or to promote balanced wear amongst the pads), (5) wear on the respective tires (e.g., to limit too much wear on any one tire, and/or to promote balanced wear amongst the tires), (6) vehicle occupant feel and comfort, (7) a lateral acceleration of the vehicle, and (8) per tire loading (e.g., vertical load on each tire). Regarding occupant comfort, for instance, it is desirable to limit change in vehicle pitch, which would be felt by the driver and any passengers.

For the second above-mentioned variable (2), weight distribution, weight-distribution data can be obtained in any of a variety of ways. Example means include some or all of the data being pre-programmed into the system, such as in connection with vehicle manufacture. As another example, the data can be generated at the vehicle, such as based on vehicle pitch and perhaps also role movements over time.

In one embodiment, the system is programmed with a default distribution, such as 50% braking force to be provided by the front brake on the applicable side and 50% to be provided by the rear brakes on that side. Such a distribution may be programmed assuming, e.g., that this distribution is best for a perfectly-balanced vehicle, or for the vehicle as it is in an unloaded state (e.g., unloaded with luggage and passengers). The fact that the vehicle is front weighted, or more likely to be front weighted (such as by the engine, other hardware, the driver, etc.), can also be considered in setting the default or in determining a braking distribution.

The operations of block 1032 can include, more particularly, determining the total force value needed on a side of the vehicle, and determining, based on the total force needed, a front/rear force distribution ratio $\alpha$ between the front and rear wheels chosen.

Determining the total force needed can include, for right hand side (RHS) forces of the vehicle, for CW turning:

$$F_{Total\ RHS} = \Delta\tau * 2/w; \text{ and} \qquad \text{(Equation 9)}$$

or for the left hand side, for CCW turning:

$$F_{Total} = \Delta\tau * 2/w, \text{ if } \Delta\tau \text{ is CCW (brake LHS)}. \qquad \text{(Equation 10)}$$

The value w is a constant, or predetermined value, representing the size of a wheel base of the vehicle. This operation is described further above in connection with 520 and is not described further at this point.

The distribution ratio $\alpha$ is determined to allocate portions of the total force value between the determined front and rear wheels based on any of the variables described above (e.g., vehicle weight, or load, distribution, etc.). The ratio is a value between zero and one.

The distribution ratio $\alpha$ may be determined by formulas such as those described above in connection with step 522 and FIG. 5. The formulas can include, if the yaw moment ($\Delta\tau$) is negative, i.e., clockwise (CW) vehicle turning is needed:

$$F_{Right\ front\ tire} = \alpha\Delta\tau * 2/w; \text{ and} \qquad \text{(Equation 11)}$$

$$F_{Right\ rear\ tire} = (1-\alpha)\Delta\tau * 2/w, \qquad \text{(Equation 12)}$$

where w is a constant (or predetermined value) representing the size of the vehicle's wheel base.

And for counterclockwise (CCW) movement (positive yaw moment ($\Delta\tau$)):

$$F_{Left\ front\ tire} = \alpha\Delta\tau * 2/w; \text{ and} \qquad \text{(Equation 13)}$$

$$F_{Left\ rear\ tire} = (1-\alpha)\Delta\tau * 2/w. \qquad \text{(Equation 14)}$$

The distribution ratio $\alpha$ will have a value between 0 and 1 (i.e., $0 < \alpha < 1$).

At decision 1034, the processor determines if the braking forces that would be required, according to the ratio $\alpha$, at each of the front tire and the rear tire, are within respective friction ellipses corresponding to the subject tires—e.g., right front and right rear tires. In some embodiments, the determination includes considering any existing steering forces. It is advantageous in this embodiment to include steering force in the friction-ellipse analyses because any steering angle effected, before the automatic-steering system failure, will generate lateral force(s) that should be considered in most-accurately evaluating ellipses.

As described above in connection with steps 524 and 526 of FIG. 5, a friction ellipse for a tire, also known as a circuit of forces, traction circle or friction circle, may provide an indication of the maximum horizontal (along the road) force that may be generated with the particular tire. As provided, the size of a friction ellipse for a tire or the amount of horizontal (along the road) force the tire may generate may be affected, in general, by aspects such as the design of the tire, the vertical load on the tire, tire wear condition, tire pressure, temperature of the tire road condition, etc.

The operation 1034 may include, e.g., determining if the distribution of the total force value for the front wheel, on the subject side of the vehicle (e.g., RHS), is within a friction ellipse for the corresponding tire of that front wheel, and determining if the distribution of the total force value for the rear wheel on the subject side (e.g., RHS) is within a friction ellipse for the tire corresponding to that rear wheel.

If it is determined in decision 1034 that both of the front and rear wheels on the subject side of the vehicle (l/r) would be outside of their respective friction ellipses if the allocated forces (per the ratio α determined), then flow of the algorithm 1000 proceeds to block 1018, as shown in FIG. 10. The processor can then calculate a new yaw value Δτ, for example, a smaller value resulting in lower per-wheel forces, and/or a new distribution ratio α if step 1034 is reached again. In one embodiment, the yaw value determined is reduced automatically in such circumstances by a pre-determined amount, such as by 5%, 10%, etc.

In one embodiment, the instructions are configured to, as needed in the re-performance of these operations, 1018, et seq., cause the processor to consider that the previous iteration resulted in force allocations that were outside of the friction ellipses for both wheels.

In a particular embodiment, the instructions also consider one or more manners (e.g., reasons, amounts, or extents) by which the forces allocated were outside of the ellipses. The processor, executing the instructions, may, for instance, process that the rear wheel force allocated was only slightly out of its ellipse and so only a slight change is needed to the ratio α. Or the processor, executing the instructions, may, for instance, process that the rear wheel force allocated was far out of its ellipse, and so relatively substantive change is needed to the calculations.

In a contemplated embodiment, the instructions are configured so that, in response to determining in decision 1034, and perhaps under other pre-set conditions, flow of the algorithm 1000 returns to one or both of earlier operations 1014, 1016. The other conditions may include, e.g., the 1034-to-1018 sub-routine having been performed a certain amount of times (with continued failure at 1034), such as two or three times. Re-performing operations 1014 and/or 1016, et seq., acts as a refresh by which the system adjusts it calculations to consider new circumstances, such as a new desired or predicted vehicle path, having changed due to vehicle-position and/or road change with the passage of time.

In one embodiment, the instructions cause the processor to, in response to a negative determination at decisions 1034 or 1036, and following re-performance of some earlier steps (e.g., any of steps 1014, 1016, 1018), skip other earlier steps, such as steps 1020 and 1022, relating to the potential use of only the electrical park brake (EPB). This course is prescribed in this embodiment, considering that the EPB will, or will likely, still not be sufficient to provide the needed force (as determined in the earlier iteration including operation 1022), though the yaw Δτ and corresponding force value has been reduced. Benefits of skipping these steps under these circumstances includes saving processing time and resources.

If it is determined in step 1034 that at least one of the required forces, front or rear, can be effected without causing the corresponding wheel to be outside of its friction ellipse, flow of the algorithm 1000 proceeds to decision diamond 1036.

At decision 1036, the processor, executing the code, considers whether both of the forces (front and rear) required according to the last-determined yaw Δτ and distribution ratio α could be applied and the corresponding wheels stay within their respective friction ellipses.

If it is determined in decision 1034 that one of the front and rear wheels, on the subject side of the vehicle, would be outside of its respective friction ellipse upon effecting the last-determined distribution α, then flow of the algorithm proceeds to re-perform one or more earlier steps. In one embodiment, the return flow proceeds to re-perform at least operation 1032, as shown in FIG. 10, to calculate a new distribution ratio α. The re-calculation at this stage will include determining a new ratio α requiring that less force be applied at the wheel (front or rear) (a first wheel for purposes of this explanation) that was determined to be outside of ellipse based on the last ratio. Assuming that the yaw moment value Δτ remains unchanged, and so the total force required remains unchanged, force allocated to the other (second) of the wheels (rear or front) according to the new, re-calculated, ratio α, would be increased by the same amount that the force allocated now to the first wheel is reduced.

In some embodiments, the instructions are configured to, in lowering the force allocated to the first wheel, lower the allocation by a pre-set amount, such as 5%, 10%, etc. In one embodiment, the instructions cause the processor to, in determining an amount by which to lower the force allocated to the first wheel, consider one or more manners (e.g., reasons, amounts, or extents) by which the previously-determined force for the first wheel was outside of the friction ellipse of the wheel. If it is determined, for instance, that the previously-determined force for the first wheel was only very slightly outside of the friction ellipse for that wheel, then the adjustment(s) (e.g., lowering the allocation of force, of the total force, for the first wheel) in re-performing previous operations (e.g., operation 1032) can be relatively small. The processor may, on the other hand, determine that the first wheel force allocated would have caused the corresponding wheel to be far out of its ellipse, and so relatively substantive change in re-performing the previous operations (e.g., operation 1032) would be needed.

For example, in re-performing operation 1032, the act of re-determining the distribution ratio α of the total force to be applied the wheels can include adjusting the distribution ratio by an amount, whether pre-determined (e.g., according to a relationship chart, relating over-ellipse amounts with amounts by which to lower the ration), that is proportional to a percentage by which the force last determined would have caused the wheel to exceed its ellipse.

If it is determined in decision 1034 that both of the forces, front and rear, according to the allocation of the distribution ratio most-recently determined, are within their respective friction ellipses, flow of the algorithm 1000 proceeds to block 1038.

At block 1038, the processor, executing the instructions, performs a fusion function configured to determine an optimal EPB/HB distribution of the total rear force ($F_{Total-rr}$ or $F_{total-rl}$) called for according to the front/rear distribution ratio α. The fusion function determines a preferred force value to be applied by the subject rear EPS ($F_{EPB-(r\ or\ l)}$) and by the same-wheel hydraulic brake ($F_{HB-rr}$ or $F_{HB-rl}$) for reaching the total required rear force ($F_{Total-rr}$ or $F_{total-rl}$).

As described previously, iterations of the present method 1000, or sub-methods thereof, are in some embodiments performed in connection with a given time period [0, ΔT], including sub-periods, or loops. The front/rear (FIR) distribution (operation 1032) and the present EPB/HB distribution (1038) determinations are thus, in these embodiments, performed for each loop of the period.

The total rear braking force $F_{rr}$ is the sum of:

$F_{EPB-rr}$ and $F_{HB-rr}$, for RHS-positive (+) Δτ, and so CCW turning; or $F_{EPB-rl}$ and $F_{HB-rl}$, for LHS-negative (−) Δτ, and so CW turning.

This is, in equation form:

$$F_{rr}=F_{EPB}\text{-}rr+F_{HB}\text{-}rr, \text{ for RHS; and} \quad (\text{Equation 15})$$

$$F_{rl}=F_{EPB}\text{-}rl+F_{HB}\text{-}rl, \text{ for LHS.} \quad (\text{Equation 16})$$

In some embodiments, the service brake, e.g., hydraulic bake (HB) has a threshold ramp-up rate, being a maximum rate by which the service brake can increase the braking force that it applies. An example threshold rate is 0.1 kN/sec, and so the actual threshold rate can be higher or lower.

For the present operation 1038, the instructions are, for these embodiments, configured to cause the processor to consider the HB ramp rate, in determining the optimal (or preferred) proportion (or distribution) of the rear force, on the applicable side of the vehicle (RHS or LHS), that will be handled by the service brake (e.g., hydraulic brake, HB).

The HB ramp rate will typically be higher, even much higher in most cases, than a ramp rate for the EPB. As a result, the EPBs can provide a higher initial force and sooner than the HBs. Because of the relatively higher ramp rate of the EPB, by using the EPBs selectively, according to determined ratios and timings, the present algorithm 1000 increases initial response rate—decreasing the amount of time between the processor providing the final brake command to the brake(s) and the applicable brake(s) actually effecting the forces called for.

Also because of the relatively higher ramp rate of the EPB, and in some cases also because the EPBs more accurately effect the desired force application, the present algorithm 1000 (using the EPBs selectively, according to determined ratios and timings) increases the accuracy by which braking can be used to control vehicle direction. This results from the force applied by the EPB, in each loop of each time period, being more controllable—e.g., more-quickly and accurately increase and decreased as desired.

In one embodiment, in causing the processor to compensate for the (usually relatively-slow) HB ramp rate, the instructions are configured to cause the processor to determine a base, or nominal, portion of the total rear force to be provided by the hydraulic brake for each loop of the period. The nominal portion will typically be relatively low for the initial and early loops as the hydraulic brake ramps up to a higher desired force from the hydraulic brake.

The nominal portion of the total force, determined for the hydraulic brake, can also be referred to as the course portion ($F_{HB}$-r, or $F_{rr\text{-}nominal}$) of the rear braking force needed, and the use of the HB as course control. For the periods [0, T] in which the hydraulic brakes are used, the EPB can be viewed as providing the fine portion ($F_{EPB\text{-}rr}=F_{rr}-F_{rr\text{-}nominal}$) of the rear braking force needed, and the function of the EPB provides fine, more accurate, control.

To explain the present algorithm 1000 further, four (4) generic examples are now provided. For each example, it is assumed that each EPB can contribute a maximum of 1 unit braking force for differential steering. It is noted that the maximum EPB braking-force contribution considered in the process 1000 need not coincide with an actual maximum braking of the EPB. For instance, it may be that the EPB is able to provide, in this example, over 1 unit of braking force, such as for emergency or parking situations, but that the present system is programmed to consider 1 unit of braking force as the maximum. Benefits include extending life of EPB components—e.g., pads.

Specific to the first of the four examples, it is be assumed that the processor, at operation 1020, determines, based on a yaw moment value (Δτ) determined at operation 1018, that 0.8 units of braking force is needed. While, as mentioned above, the processor in some embodiments determines not just a single needed force, but a series or sequence of forces needed for each loop, or sub-period, of a present period, the first example includes identification of the single 0.8 units of braking force for simplicity of illustration, and because the process can in some embodiments include the processor identifying at times a single needed force for a present period. Further in this first example, the processor determines that, based on a sign (+/−) of the yaw moment value, and the sign convention being used (e.g., positive yaw value corresponds with a needed CW turn, and vice versa), that the 0.8 units of braking force would be needed on the right side of the vehicle (i.e., at the $EPB_{RHS}$). At decision 1022, the processor would compare the needed braking force of 0.8 units on the right side to the maximum available braking force at the $EPB_{RHS}$ of 1.0 unit and determine that the $EPB_{RHS}$ is sufficient alone to provide the needed 0.8 units of force. Flow of the algorithm 1000 thus proceeds from decision 1022 to operation 1024 whereat the processor initiates provision of a braking command to the $EPB_{RHS}$ to apply the 0.8 units of force for effecting the vehicle yaw determined, at operation 1018, needed for the present period.

Specific to the second of the four examples, it is be assumed that the processor, at operation 1020, determines, based on one or more yaw moment values (Δτ) determined, at operation 1018 in connection with an upcoming period [0, Δτ=1 second], that a series of eleven brake forces are needed, one in connection with each 0.1 s loop of the period as follows: 0.5, 0.7, 0.9, 1.0, 0.8, 0.7, 0.5, 0.4, 0.3, 0.2, and 0.2 units of braking force. Further in this second example, the processor determines that, based on a sign (+/−) of the yaw moment value, and the sign convention being used, that each of eleven needed braking force applications would be needed on the left side of the vehicle (i.e., at the $EPB_{LHS}$). At decision 1022, the processor would compare each of the needed braking forces on the left side to the maximum available braking force at the $EPB_{LHS}$ (1.0 units) and determine that the $EPB_{LHS}$ is sufficient alone to provide each of the needed force applications for the period. Flow of the algorithm 1000 thus proceeds from decision 1022 to operation 1024 whereat the processor initiates provision of one or more braking commands to the EPB$_{LHS}$ to apply the series of braking forces, for effecting the vehicle yaw determined, at operation 1018, needed for the present period.

Specific to the third of the four examples, it is be assumed that the processor, at operation 1020, determines, based on a yaw moment value (Δτ) determined at operation 1018, that 1.5 units of braking force is needed. While, again, as mentioned above, the processor in some embodiments determines not just a single needed force, but a series or sequence of forces needed for each loop, or sub-period, of a present period, the first example includes identification of the single 1.5 units of braking force (e.g., kiloNewtons (kN), or pounds force (lbf)) for simplicity of illustration, and because the process can in some embodiments include the processor identifying at times a single needed force for a present period. Further in this third example, the processor determines that, based on a sign (+/−) of the yaw moment value, and the sign convention being used (e.g., positive yaw value corresponds with a needed CW turn, and vice versa), that the 1.5 units of braking force would be needed on the left side of the vehicle (i.e., at the EPB$_{LHS}$). At decision 1022, the processor would compare the needed braking force of 1.5 units on the right side to the maximum available braking force at the EPB$_{LHS}$ (1.0 units) and determine that the EPB$_{LHS}$ is in this case not sufficient to alone provide the needed 1.5 units of force. Flow of the algorithm 1000 thus proceeds from decision 1022 to operation 1032 whereat the processor calculates a preferred, or optimal, front/rear distribution ratio α. Example variables for determining the optimal front/rear distribution are described above. It assumed for this example that the distribution determined is 0.6, which depending on the convention, can require that 60% of the left hand side braking (i.e., 0.9 units of braking force) needed be provided in the rear, and so 40% (1−0.6=0.4; or 0.6 units of braking force) in the front. It is further assumed for this third example that the processor then makes positive determinations at each of decision diamonds 1034 and 1036, regarding the applicable friction ellipses, and so flow proceeds to 1038. At operation 1038, the processor determines a preferred, or optimal, EPB/HB fusion or balance for providing the 60% force needed at the rear left. In this example, the processor determines that 90% of the total needed rear braking force (=0.9) should be provided by the hydraulic (HB$_{LHS}$), and so 10% by the electrical park brake (EPB$_{LHS}$). Example variables for determining the optimal EPB/HB fusion are described above. At operation 1040, the processor initiates provision of respective braking commands to the EPB$_{LHS}$, for applying the 10% of the needed rear force—i.e., 0.1×0.9=0.09 units force, and to the HB$_{LHS}$, for applying the 90% of the needed rear force—i.e., 0.9×0.9=0.81 units force, for effecting the vehicle yaw determined (e.g., operation 1018) needed. As provided, for embodiments in which the hydraulic brakes have a relatively-slow ramp-up rate, the instructions are configured to determine the EPB/HB fusion for each loop of the period with consideration given to the ramp-up rate. The compensation can include, e.g., never assigning the HB to apply more than it can according to its ramp up, or by commanding the EPB to make up for the shortcomings during the ramp up. For instance, in this example, if the hydraulic brake can ramp up only at increments of 0.1 kN/s, then the processor can command the EPB to provide more force, during any time spans during which the HB is ramping up to a desired force level for the HB, and at a level sufficient to cover the spread, or at a level to cover the spread as much as possible. It should be appreciated that this extra EPB force can facilitate a quick start to the braking function (quicker start than if only the hydraulic brakes were used), and be decreased in a converse relation to the HB ramp up rate, until the HB ramps up to the amount needed from the HB during the period, and therefore the EPB provides the base amount of force determined needed from the EPB during the period.

Specific to the forth of the four examples, it is be assumed that the processor, at operation 1020, determines, based on one or more yaw moment values (Δτ)) determined, at operation 1018 in connection with an upcoming period [0, Δτ=1 s], that a series of eleven brake forces are needed, one in connection with each 0.1 s loop of the period as follows: 0.8, 0.9, 0.9, 0.9, 0.9, 1.0, 1.2, 1.0, 0.9, 0.8, and 0.8 units of braking force. Further in this fourth example, the processor determines that, based on a sign (+/−) of the yaw moment value, and the sign convention being used, that each of eleven needed braking force applications would be needed on the left side of the vehicle (i.e., at the EPB$_{LHS}$). At decision 1022, the processor would compare each of the needed braking forces on the left side to the maximum available braking force at the EPB\$_{LHS}$ (1.0 units) and determine, accordingly, that the EPB$_{LHS}$ is not sufficient alone to provide every of the needed force applications for the period—i.e., the EPB$_{LHS}$ cannot alone provide the seventh-loop, 1.2 units force, needed braking force of the period. Flow of the algorithm 1000 thus proceeds from decision 1022 to operation 1032 whereat the processor calculates a preferred, or optimal, front/rear distribution ratio α for each loop of the period. Again, example variables for determining the optimal front/rear distribution are described above. It assumed for this example that the distribution determined is 0.6, which depending on the convention, can require that 60% of the left hand side braking in each loop be provided in the rear, and so 40% in the front. It is further assumed for this fourth example that the processor then makes positive determinations at each of decision diamonds 1034 and 1036, regarding the applicable friction ellipses, and so flow proceeds to 1038. At operation 1038, the processor determines a preferred, or optimal, EPB/HB fusion or balance for providing the 60% force needed at the rear left. In this fourth example, the processor determines that 80% of the total needed rear braking force (=0.8) should be provided by the hydraulic (HB$_{LHS}$), and so 20% by the electrical park brake (EPB$_{LHS}$). Example variables for determining the optimal EPB/HB fusion are described above. At operation 1040, the processor initiates provision of respective braking commands to the EPB$_{LHS}$, for applying the 20% of the needed rear force in each loop of the period, and to the HB$_{LHS}$, for applying the 80% of the needed rear force in each loop, for effecting the vehicle yaw determined (e.g., operation 1018) needed. And again, as provided, for embodiments in which the hydraulic brakes have a relatively-slow ramp-up rate, the instructions are configured to determine the EPB/HB fusion for each loop of the period with consideration given to the ramp-up rate. The compensation can include, e.g., never assigning the HB to apply more than it can according to its ramp up, or by commanding the EPB to make up for the shortcomings during the ramp up. For instance, in this example, if the hydraulic brake can ramp up only at increments of 0.1 kN/s, then the processor can command the EPB to provide more force, during any time spans during which the HB is ramping up to a desired force level for the HB, and at a level sufficient to cover the spread, or at a level to cover the spread as much as possible. It should be appreciated that this extra EPB force can facilitate a quick start to the braking function (quicker start than if only the hydraulic brakes were used), and be decreased in a converse relation to the HB ramp up rate, until the HB ramps up to the amount needed from the HB during the period, and therefore the EPB provides the base amount of force determined needed from the EPB during the period.

With continued reference to the method 1000 of FIG. 10, at block 1040, the processor facilitates vehicle control during the present period according to the optimal fusion determined.

Flow proceeds to block 1026, et seq., which are described above.

It should be appreciated that the present algorithm 1000, including selective fusion of the electrical park and hydraulic brakes, takes optimal advantage of the capability of both types of brakes. The accuracy and speed by which the electrical park brake (EPB) can apply its force are taken advantage of in each instance, e.g., in each loop of each period, of the present algorithm 1000, whether flow proceeds in the iterations along the affirmative and/or negative paths from the EPB-sufficiency decision 1022. And the extra force available from the hydraulic brakes is accessed selectively, only when needed—e.g., only in response to a negative determination at block 1022.

IV. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

Unless specifically stated otherwise, as apparent from the discussions herein, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices.

The processes and functions presented herein are not inherently related to any particular computer, network or other apparatus. Embodiments of the technology described herein are not described with reference to any particular programming language, machine code, etc. It will be appreciated that a variety of programming languages, network systems, protocols or hardware configurations may be used to implement the teachings of the embodiments of the technology as described herein. In some embodiments, one or more methods of embodiments of the technology may be stored as instructions or code in an article such as a memory device, where such instructions upon execution by a processor or computer result in the execution of a method of an embodiment of the technology.

A computer program application stored in non-volatile memory or computer-readable medium (e.g., register memory, processor cache, RAM, ROM, hard drive, flash memory, CD ROM, magnetic media, etc.) may include code or executable instructions that when executed instruct or cause a controller or processor to perform methods discussed herein. The non-volatile memory and/or computer-readable medium may be a non-transitory computer-readable media including all forms and types of memory and all computer-readable media except for a transitory, propagating signal.

While there have been shown and described fundamental novel features of the technology as applied to several embodiments, it will be understood that various omissions, substitutions, and changes in the form, detail, and operation of the illustrated embodiments may be made by those skilled in the art without departing from the spirit and scope of the technology. Substitutions of elements from one embodiment to another are also fully intended and contemplated.

While certain features of the technology have been illustrated and described herein, many modifications, substitutions, changes, and equivalents may now occur to those of ordinary skill in the art. It is, therefore, to be understood that the appended claims are intended to cover all such modifications and changes as fall within the true spirit of the technology.

What is claimed is:

1. A method, for controlling direction of a vehicle as needed in connection with operation of an autonomous driving maneuver using selectively, independently and/or in combination, multiple electrical park brakes (EPBs) associated with at least two rear wheels of the vehicle and multiple hydraulic brakes associated with the at least two rear wheels of the vehicle and two front wheels of the vehicle, comprising:
   determining, by an in-vehicle processor, a total brake force needed for redirecting the vehicle in a pre-determined manner;
   determining, by the processor, whether an applicable electrical park brake (EPB), of the multiple electrical park brakes (EPBs), can provide the total brake force needed;
   providing, by the processor, if it is determined that the applicable electrical park brake (EPB) can provide the total brake force needed, a brake command instructing the applicable electrical park brake (EPB) to apply the total brake force; and
   determining, by the processor, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

2. The method of claim 1, wherein the vehicle further includes front electrical park brakes (EPBs), associated with each of the front wheels of the vehicle, and determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

3. The method of claim 1, wherein the autonomous driving maneuver includes at least one maneuver selected from a group consisting of Lane Centering (LC), Lane Keeping Assist (LKA), and Lane Change Control (LXC).

4. The method of claim 1, wherein determining the optimal fusion includes processing a ramp threshold associated with the rear hydraulic brake.

5. The method of claim 4, wherein processing the ramp threshold includes commanding the applicable electrical park brake (EPB) to apply additional force momentarily to compensate for ramping up of the rear hydraulic brake.

6. The method of claim 1, further comprising:
activating a lane centering sub-system of the vehicle;
determining that a failure condition affecting an electric power steering sub-system of the vehicle exists; and
switching, in response to determining that the failure condition exists, operation of the lane centering sub-system from steering control to differential-braking control.

7. The method of claim 1, further comprising:
determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; and
determining whether applications of the front hydraulic portion of the total force would place a front tire, corresponding to the front hydraulic brake, outside of a friction ellipse associated with the front tire.

8. The method of claim 7, further comprising determining, if both of the rear tire and the front tire would be placed outside of its respective friction ellipse by application of the determined forces, a new front/rear-brake distribution for providing the total brake force determined.

9. The method of claim 7, further comprising determining, if only one of the rear tire and the front tire would be placed outside of its respective friction ellipse by application of the determined forces, a new yaw moment value and determining, based on the new moment value, a new total force to be effected at the vehicle.

10. A vehicle system, comprising:
a processor; and
a computer-readable medium having instructions that, when executed by the processor, cause the processor to perform operations, for controlling direction of a vehicle using selectively multiple electrical park brakes (EPBs) and multiple hydraulic brakes of the vehicle, comprising:
determining a total brake force needed for redirecting the vehicle in a pre-determined manner;
determining whether an applicable electrical park brake (EPB), of the multiple electrical park brakes (EPBs), can provide the total brake force needed;
providing, if it is determined that the applicable electrical park brake (EPB) can provide the total brake force needed, a brake command instructing the applicable electrical park brake (EPB) to apply the total brake force; and
determining, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

11. The system of claim 10, wherein the vehicle further includes front electrical park brakes (EPBs), associated with each of the front wheels of the vehicle, and the operation of determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

12. The system of claim 10, wherein the operation of determining the optimal fusion includes processing a ramp threshold associated with the rear hydraulic brake.

13. The system of claim 12, wherein processing the ramp threshold includes commanding the applicable electrical park brake (EPB) to apply additional force momentarily to compensate for ramping up of the rear hydraulic brake.

14. The system of claim 10, wherein the operations further comprise:
determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire;
determining whether applications of the front hydraulic portion of the total force would place a front tire, corresponding to the front hydraulic brake, outside of a friction ellipse associated with the front tire; and
determining, if both of the rear tire and the front tire would be placed outside of its respective friction ellipse by application of the determined forces, a new front/rear-brake distribution for providing the total brake force determined.

15. The system of claim 10, wherein:
determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire;
determining whether applications of the front hydraulic portion of the total force would place a front tire, corresponding to the front hydraulic brake, outside of a friction ellipse associated with the front tire; and
the operations further comprise determining, if only one of the rear tire and the front tire would be placed outside of its respective friction ellipse by application of the determined forces, a new yaw moment value and determining, based on the new moment value, a new total force to be effected at the vehicle.

16. A computer-readable storage device comprising instructions that, when executed by a processor, cause the processor to perform operations, for controlling direction of a vehicle using selectively multiple electrical park brakes (EPBs) and multiple hydraulic brakes of the vehicle, comprising:
determining a total brake force needed for redirecting the vehicle in a pre-determined manner;
determining whether an applicable electrical park brake (EPB), of the multiple electrical park brakes (EPBs), can provide the total brake force needed;
providing, if it is determined that the applicable electrical park brake (EPB) can provide the total brake force needed, a brake command instructing the applicable electrical park brake (EPB) to apply the total brake force; and determining, if it is determined that the applicable electrical park brake (EPB) cannot alone provide the total brake force needed, an optimal fusion of the multiple electrical park brakes (EPBs) and the multiple hydraulic brakes, including determining a front portion of the total brake force to be provided by a front hydraulic brake, of the multiple hydraulic brakes, on an applicable front wheel, a rear hydraulic portion of the total brake force to be provided by a rear hydraulic brake, of the multiple hydraulic brakes, on an applicable rear wheel, and a rear-EPB portion to be provided by the applicable electrical park brake (EPB), of the multiple electrical park brakes (EPBs), at the applicable rear wheel.

17. The computer-readable storage device of claim 16, wherein the vehicle further includes front electrical park brakes (EPBs), associated with each of the front wheels of the vehicle, and the operation of determining the optimal fusion of the multiple electrical park brakes (EPBs) and the multiple hydraulic brakes, includes determining a front portion of the total brake force to be provided by a front EPB-portion to be provided by an applicable front electrical park brake (EPB).

18. The computer-readable storage device of claim 16, wherein:

the operation of determining the optimal fusion includes processing a ramp threshold associated with the rear hydraulic brake; and processing the ramp threshold includes commanding the applicable electrical park brake (EPB) to apply additional force momentarily to compensate for ramping up of the rear hydraulic brake.

19. The computer-readable storage device of claim 16, wherein:

the operation of determining the optimal fusion includes processing a ramp threshold associated with the rear hydraulic brake; and the operations further comprise:
activating a lane centering sub-system of the vehicle;
determining that a failure condition affecting an electronic power steering sub-system of the vehicle exists; and
switching, in response to determining that the failure condition exists, operation of the lane centering sub-system from steering control to differential-braking control.

20. The computer-readable storage device of claim 16, wherein the operations further comprise:

determining whether applications of the rear-EPB portion of the total force and rear hydraulic portion of the total force would place a rear tire, corresponding to the rear hydraulic brake and the applicable electrical park brake (EPB), outside of a friction ellipse associated with the rear tire; and determining whether applications of the front hydraulic portion of the total force would place a front tire, corresponding to the front hydraulic brake, outside of a friction ellipse associated with the front tire.

* * * * *